United States Patent [19]

Sakashita et al.

[11] Patent Number: 5,061,999
[45] Date of Patent: Oct. 29, 1991

[54] MULTIPLEX SIGNAL PROCESSING APPARATUS

[75] Inventors: Seiji Sakashita, Yawata; Hiroaki Ozeki, Neyagawa; Ippei Kanno, Hirakata; Yoshio Abe, Ibaraki, all of Japan

[73] Assignee: Matsushita Electric Industrial Co., Ltd., Osaka, Japan

[21] Appl. No.: 268,966

[22] Filed: Nov. 9, 1988

[30] Foreign Application Priority Data

Nov. 13, 1987 [JP] Japan ................................. 62-287910
Nov. 13, 1987 [JP] Japan ................................. 62-287911

[51] Int. Cl.$^5$ .......................... H04N 7/04; H04N 7/06
[52] U.S. Cl. ....................................... 358/142; 358/12
[58] Field of Search ................... 358/12, 14, 15, 142, 358/143, 144, 146, 197, 198; 455/42, 45, 102, 112; 370/69.1, 77, 118

[56] References Cited

U.S. PATENT DOCUMENTS

| | | | |
|---|---|---|---|
| 4,476,484 | 10/1984 | Haskell | 358/11 |
| 4,543,593 | 9/1985 | Oliphant | 358/12 |
| 4,556,973 | 12/1985 | Uemura | 358/142 |
| 4,577,226 | 3/1986 | Avins | 358/143 |
| 4,589,011 | 5/1986 | Rzeszewski | 358/11 |
| 4,652,903 | 3/1987 | Lucas | 358/11 |
| 4,706,109 | 11/1987 | Murray | 358/12 |

OTHER PUBLICATIONS

"An Extended Definition Television System Using Quadrature Modulation of the Video Carrier with Inverse Nyquist Filter", Yasumoto et al., 8-1987, vol––CE-33, No. 3, pp. 173-180, IEEE Transactions on Consumer Electronics.

Investigation for Satellite Broadcast Receiving Technique of Satellite Broadcast Receiver (Target Rating), Part I, Jun., 1983, Issued by Association of Electromagnetic Wave Technology.

Nikkei Electronics, 1987.11.2 (No. 433) pp. 189-212.
Nikkei Electronics, 1987.8.10 (No. 427) pp. 97-112.

*Primary Examiner*—John W. Shepperd
*Attorney, Agent, or Firm*—Wenderoth, Lind & Ponack

[57] ABSTRACT

A signal of the same frequency band as an ordinary NTSC signal of the video signals is transmitted with the conventional frequency band but the other frequency components are frequency-converted to a frequency higher than the sound subcarrier as the multiplex signal. The ordinary video signal, sound subcarrier and multiplex signal are frequency-multiplexed and the main carrier is transmitted by angle modulation as the modulation signal. In this case, as the multiplex signal, a signal other than the ordinary signal may directly be frequency-multiplexed and the signal may be multiplexed. Using amplitude or angle modulation to improve the demodulation accuracy or S/N through the angle modulation. The ordinary signal is regenerated like in the conventional system, without influence on the conventional receiver. In addition, since the ordinary video signal and the multiplex signal are separated in the frequency band, these may be used as the independent new transmission bands. Therefore, information other than the video signal can also be transmitted.

24 Claims, 27 Drawing Sheets

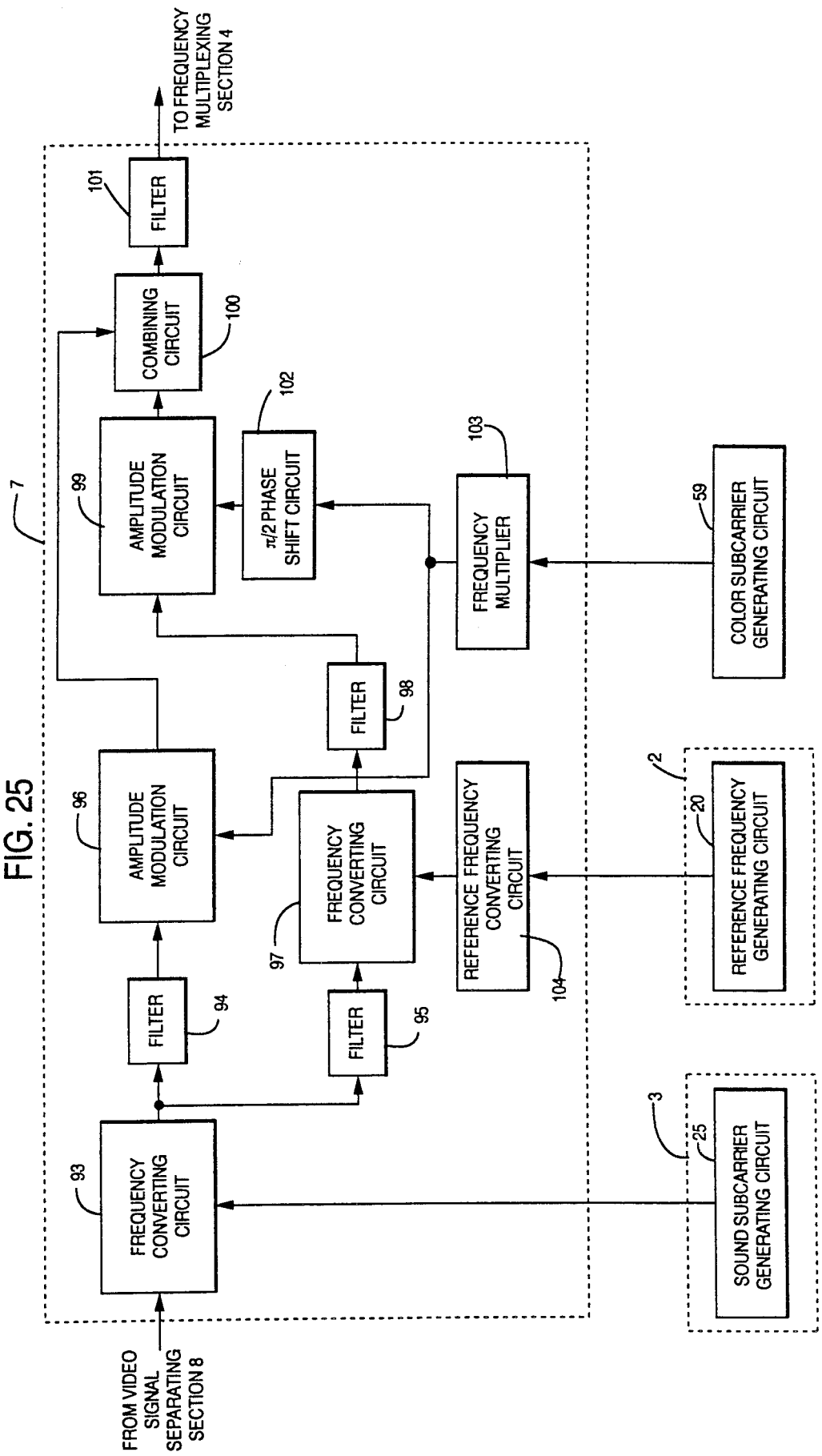

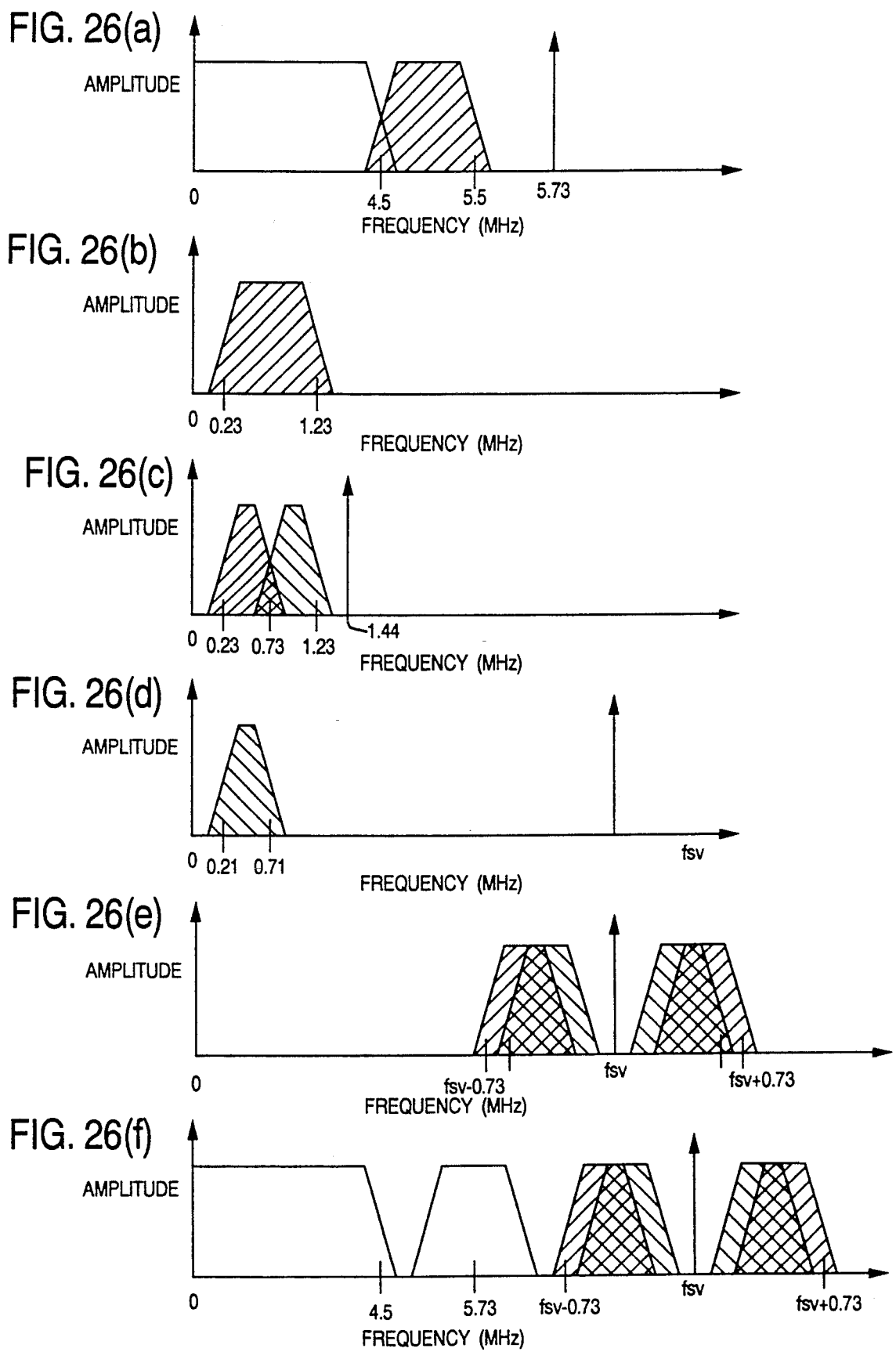

MULTIPLEX SIGNAL PROCESSING APPARATUS

BACKGROUND OF THE INVENTION

1. Field of the Invention

The present invention relates to a transmission apparatus to be used for satellite broadcasting and satellite communication.

2. Description of Prior Art

Since the sound subcarrier is allocated to 5.73 MHz in conventional satellite broadcasting, the video signal is about 4.5 MHz. The video signal and sound subcarrier are frequency-multiplexed to form a modulation signal and the main carrier has been transmitted after angle modulation. Such a transmission method is described in the report of Investigation for Satellite Broadcast Receiving Technique of Satellite Broadcast Receiver (Target Rating), Part I, issued by the Association of Electromagnetic Wave Technology (June, 1983). In the conventional modulation system, the highest frequency of the video signal is selected to be 4.5 MHz for transmission and if the frequency is raised so as to exceed such a frequency, the spectrum overlaps giving considerable interference because the sideband of the sound subcarrier exists within the range of from 5 MHz to 6.4 MHz. However, in the recent development of high quality display techniques, realization of an improvement in resolution and an enlargement of the aspect ratio is now discussed and it is necessary for such a purpose to increase the amount of information contained in the video signal by expanding its frequency band. As systems for transmitting high definition signals, band compression type MUSE and MAC has been developed. These techniques are described in NIKKEI ELECTRONICS 1987.11.2 (no433)pp189-212, NIKKEI ELECTRONICS 1987.8.10(no427)pp 97-112. However, these systems cannot be applied to the conventional satellite broadcast receiver and therefore it is impossible to enjoy programs of such satellite broadcasting with the conventional receiver. It is therefore expected to provide a signal transmission apparatus which can receive the programs of conventional satellite broadcasting without giving interference to the conventional receiver and realizes a display with a higher resolution and an enlargement of aspect ratio.

SUMMARY OF THE INVENTION

It therefore an object of the present invention to provide a multiplex signal processing apparatus which can transmit the video signal for a high definition display and an enlargement of the aspect ratio without giving interference to the conventional satellite broadcast receiver.

In order to attain such object, a multiplex signal processing apparatus of the present invention separates a video signal into a main video signal which has been used in the conventional transmission system and a multiplex signal including information for high resolution and enlargement of an aspect ratio and then multiplexes the frequency of the multiplex signal into a video signal similar to that of prior art and sound subcarrier. In this case, the multiplex signal is allocated, by frequency conversion to a frequency band higher than a sound subcarrier as the multiplex modulation signal. This modulation signal thus obtained is transmitted as the satellite broadcast signal by angle modulation of main carrier. During the receiving operation, the main carrier of satellite broadcast signal is demodulated to extract the modulation signal and frequency is multiplexed respectively into the video signal, sound subcarrier and multiplex modulation signal. The multiplex signal regenerated from the multiplex modulation signal is combined with the video signal and is output as the video signal including the information for higher resolution and enlargement of aspect ratio.

With the structure described earlier, the video signal including the information for higher resolution than that of conventional video signal and enlargement of aspect ratio can be transmitted; in the conventional transmission system and moreover interference which results in a problem for practical operation is not generated on the conventional receiver and good matching to the conventional receiver can be attained. In addition, the multiplex signal processing apparatus of the present invention is effective as a new transmission path which can add not only a part of the video signal but also the information as the image, for example, the information about motion as the multiplex signal.

BRIEF DESCRIPTION OF THE DRAWINGS

FIG. 25 is a block diagram of the multiplex modulation signal generating section of the multiplex signal processing apparatus in accordance with a seventh embodiment of the present invention where, after frequency conversion of the subvideo signal with sound subcarrier, the multiplex modulation signal is generated by amplitude modulation of a pair of orthogonal color subcarriers multiplexed to respective frequency bands;

FIG. 26a–26f are frequency spectrum of the seventh embodiment of the present invention where, after frequency conversion of the subvideo signal with sound subcarrier, the multiplex modulation signal is generated by amplitude modulation of a pair of orthogonal color subcarriers multiplexed to respective frequency bands;

DESCRIPTION OF THE PREFERRED EMBODIMENTS

Figure 1:
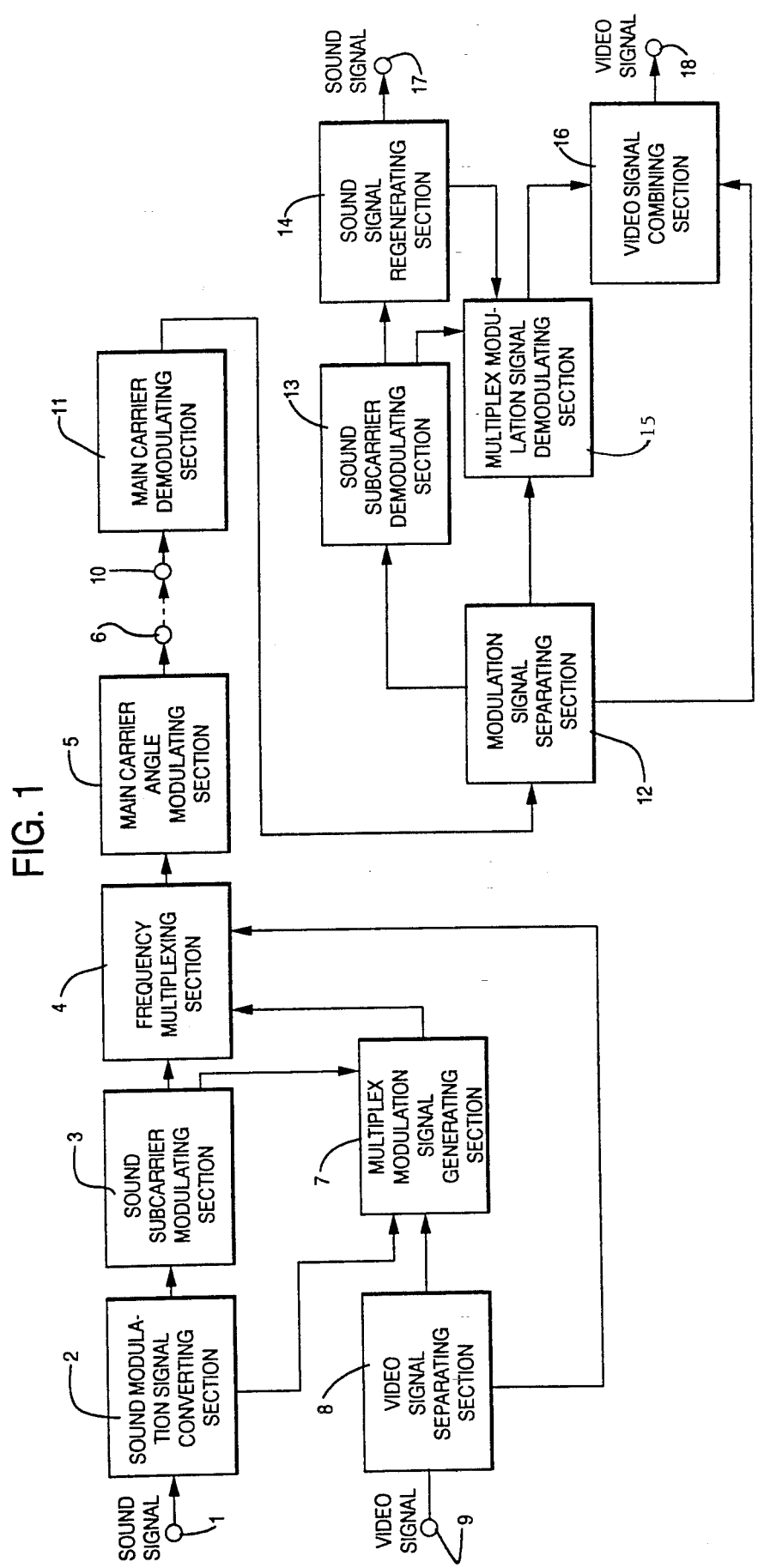
FIG. 1 is a block diagram of a multiplex signal processing apparatus covering from generation to recovery of a satellite broadcast signal to be used in common to all embodiments of the present invention.

In FIG. 1, a sound signal enters from a terminal 1 and is encoded into a digital sound signal to be transmitted as the satellite broadcast signal in a sound modulation signal converting section 2. Moreover the sound subcarrier is PSK-modulated by the digital sound signal in a sound subcarrier modulating section 3 and then enters a frequency multiplexing section 4. Meanwhile, a video signal enters from a terminal 9 and is separated by a main and sub video signal separating section 8 into the main video signal having the same frequency band and apsect ratio as the conventional signal and other subvideo signal. The separated main video signal enters a frequency multiplexing section 4, while the subvideo signal is converted to a signal suitable for frequency multiplexing by making use of a reference frequency signal to form the sampling frequency of a sound modulation signal converting section 4 and the sound subcarrier signal of a sound subcarrier modulating section 3, then enters a multiplex modulation signal generating section 7, which converts the frequency to a frequency band higher than the sound subcarrier, and outputs the converted signal as a multiplex modulation signal. The multiplex modulation signal then enters the frequency multiplexing section 4 and is frequency-multiplexed to the main video signal and sound subcarrier as explained previously to produce the modulation signal. The modulation signal output from the frequency multiplexing section 4 modulates the main carrier in a main carrier angle modulating section 5 and is thereafter output from a terminal 6 as a satellite broadcast signal.

Figure 2:
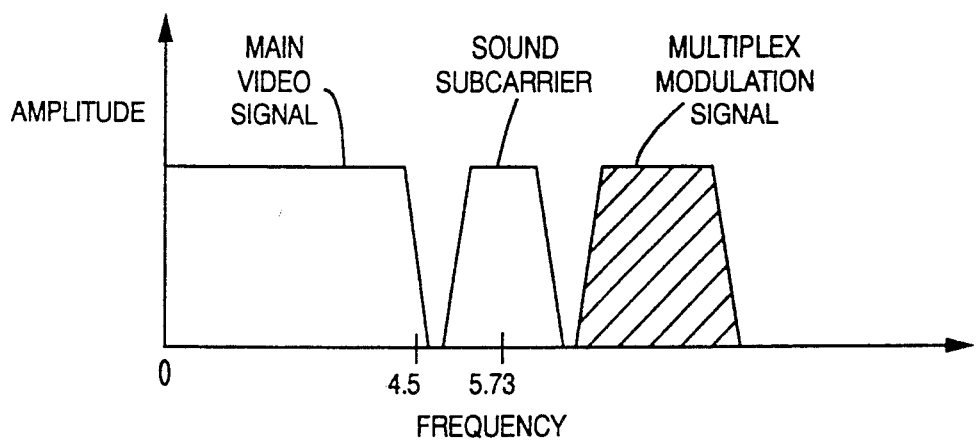
FIG. 2 indicates frequency allocation of a modulation signal of the satellite broadcast signal to be used in common to all embodiments of the present invention.

Moreover, during the receiving operation, this satellite broadcast signal enters a terminal 10, the modulation signal is extracted by a main carrier demodulating section 11 and it is then frequency-separated into the main video signal, multiplex modulation signal and sound subcarrier in a modulation signal separating section 12. The main video signal enters a main and subvideo signal combining section 16. The multiplex modulation signal enters a multiplex modulation signal demodulating section 15 and the subvideo signal can be extracted by making use of the sound subcarrier of the sound subcarrier demodulating section 13 and the PCM bit clock signal of a sound signal regenerating section 14. Thereafter, the subvideo signal enters the main and sub video signal combining section 16. The main and subvideo signal combining section 16 combines the main and subvideo signals to regenerate the video signal realizing high resolution and enlargement of aspect ratio and outputs such video signal from a terminal 18. Moreover, the sound subcarrier enters a sound subcarrier demodulating section 13, regenerated to the sound modulation signal, regenerated to the sound signal in the sound signal regenerating section 14 and is then output from a terminal 17. As explained previously, in this embodiment, as shown in FIG. 2, the main video signal and sound signal are allocated in the same way as the conventional system. In the frequency spectrum, only the multiplex modulation signal is allocated in the frequency band higher than the sound subcarrier. Accordingly, the multiplex modulation signal and conventional signal are separated from each other with a filter and thereby the circuit structure can be simplified. Moreover, when the present invention is applied to the conventional receiver, the receiver can display the image and reproduce the sound of the conventional signals, ensuring compatibility with conventional systems.

Figure 3:
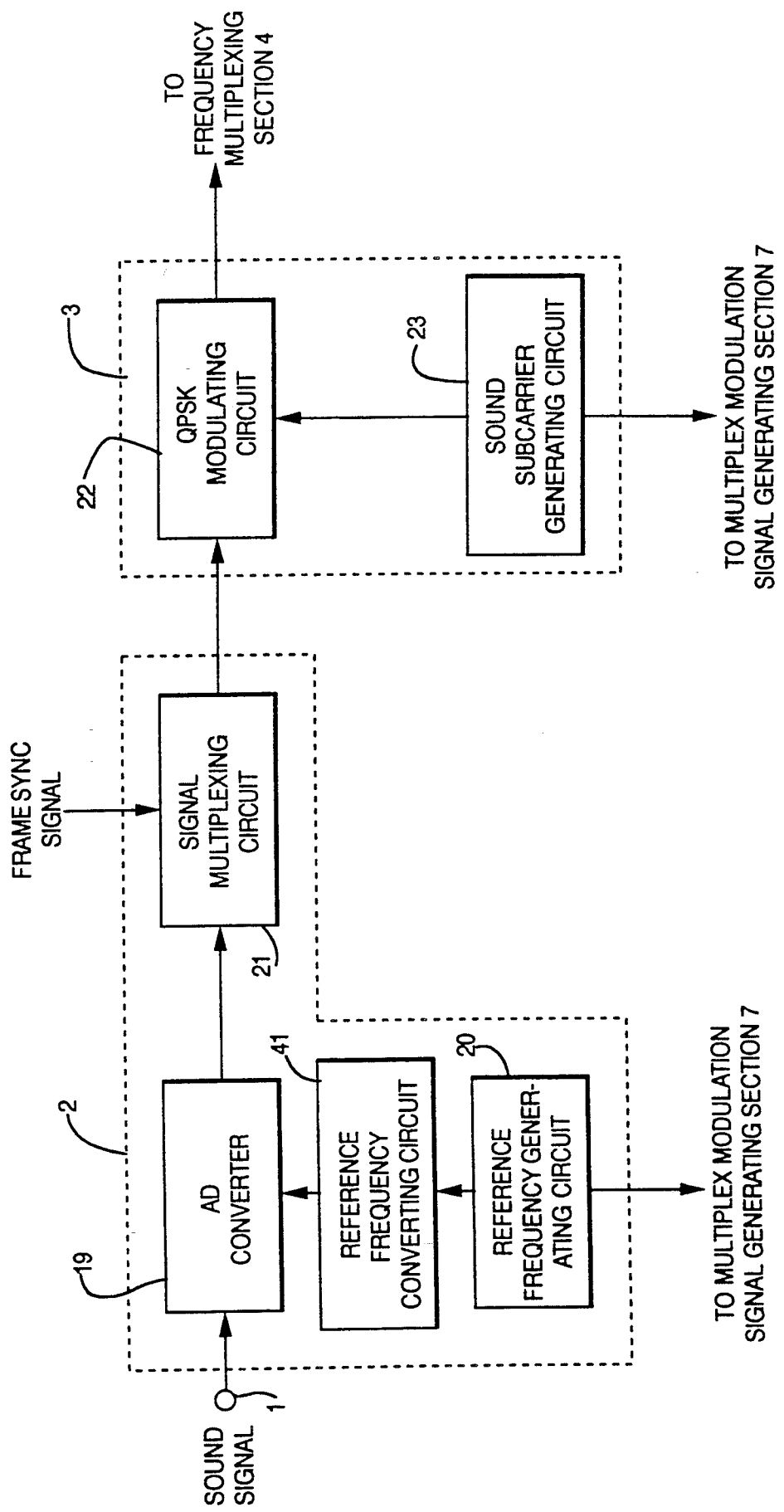
FIG. 3 is a block diagram of a sound modulation signal converting section and a sound subcarrier modulating section of the multiplex signal processing apparatus to be used in common to all embodiments of the present invention.

FIG. 3 is a block diagram of the sound modulation signal converting section 2 and a sound carrier modulating section 3. The sound signal entering from the terminal 1 is encoded by an A/D converter 19. The encoding is carried out as explained hereunder. Namely, a reference frequency generated by a reference frequency generating circuit 20 which generates the frequency equal to an integer times the sampling frequency is divided by a frequency converting circuit signal 41 to result in the sampling frequency of 32 kHz or 48 kHz. The encoded digital sound signal multiplexes an independent data, a control code and an additional signal of a frame synchronous signal in a signal multiplexing circuit 21, modulates the sound subcarrier sent from a sound subcarrier generating circuit 23 in a Quad-PSK modulating circuit 22 and then supplies the signal to the frequency multiplexing section 4 in the next stage. In this case, the reference frequency and sound subcarrier signal are supplied to the multiplex modulation signal generating section 7. The sound modulation signal is transmitted, in some cases, by time division multiplexing within the conventional video signal.

Figure 4:
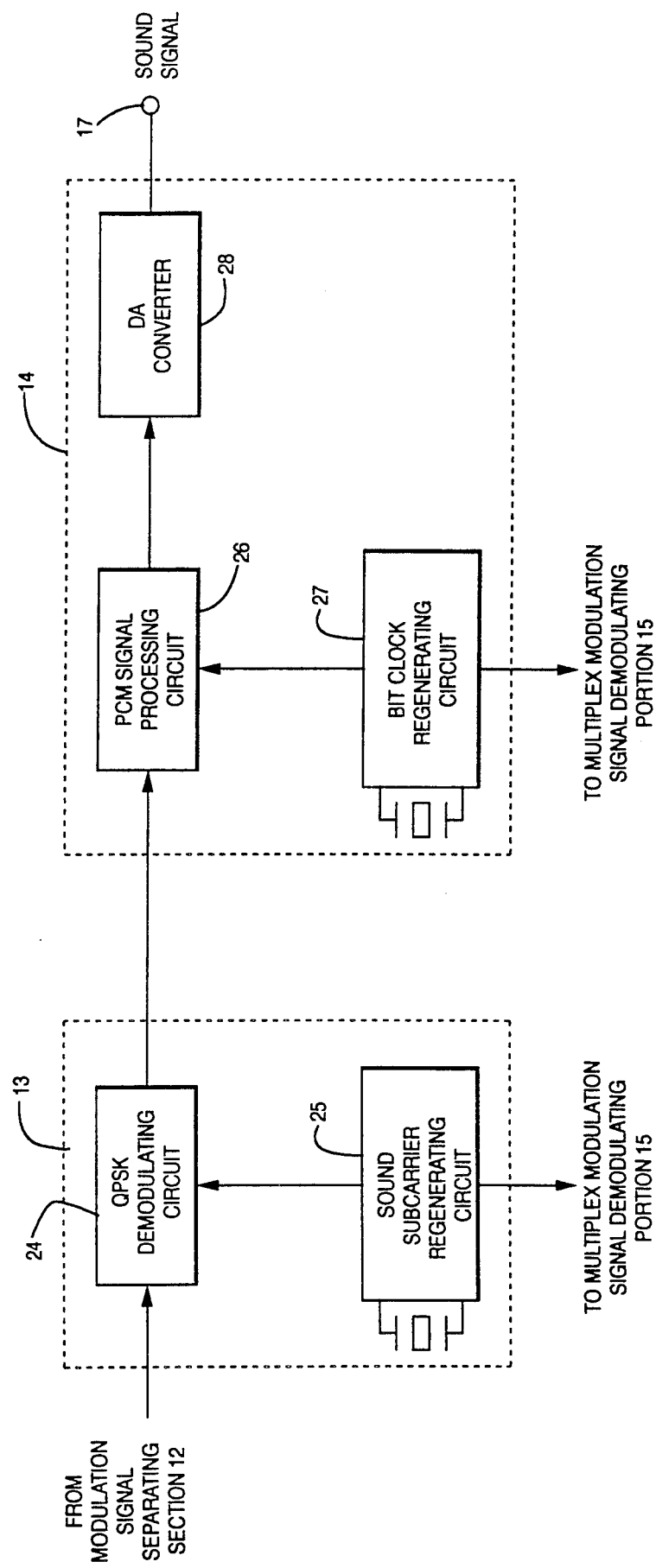
FIG. 4 is a block diagram of a sound subcarrier demodulating section and a sound signal regenerating section of the multiplex signal processing apparatus to be used in common to all embodiments of the present invention.

FIG. 4 is a block diagram of the sound subcarrier demodulating section 13 and a sound signal regenerating section 14. The sound subcarrier modulated by the digital voice signal from the modulation signal separating section 12 enters a Quad-PSK demodulating circuit 24, demodulated to a PCM signal with a signal supplied from a sound subcarrier regenerating circuit 25 and then enters a PCM signal processing circuit 26. The PCM signal is demodulated by a clock generated from a bit clock regenerating circuit 27 for PCM signal processing. This PCM signal is converted to an analog sound signal in a D/A converter 28 and is then output from the terminal 17. In this case, the sound subcarrier is supplied to the multiplex signal demodulating section 15 from the sound subcarrier regenerating circuit 25 and the bit clock from the bit clock regenerating circuit 27 for PCM signal processing.

Figure 7A:
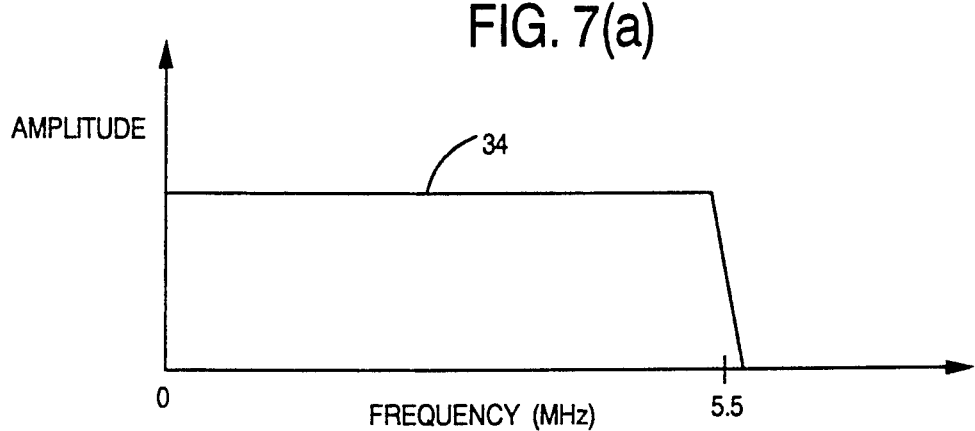
FIGS. 7a and 7b are frequency spectrum in an embodiment of the multiplex signal processing apparatus which realizes main and sub video signal multiplexing through multiplexing of frequency when the video signal includes a high definition signal.
Figure 7B:
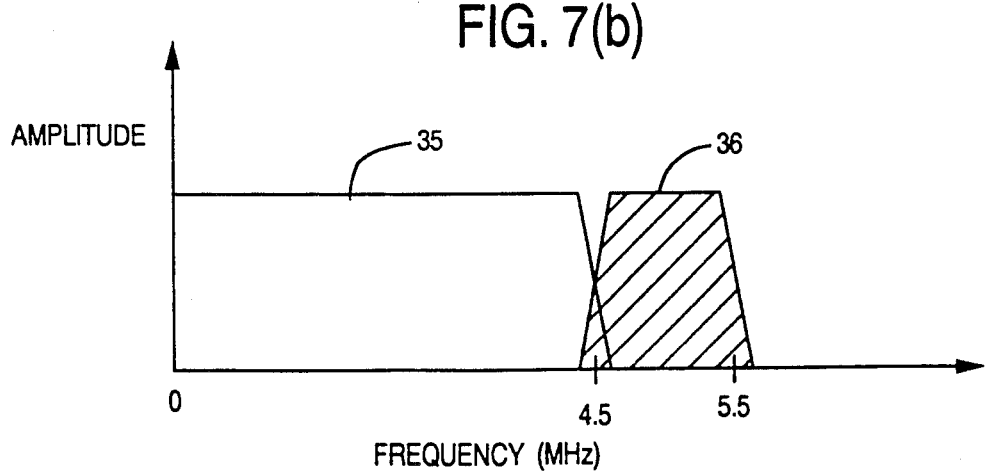
Figure 5:
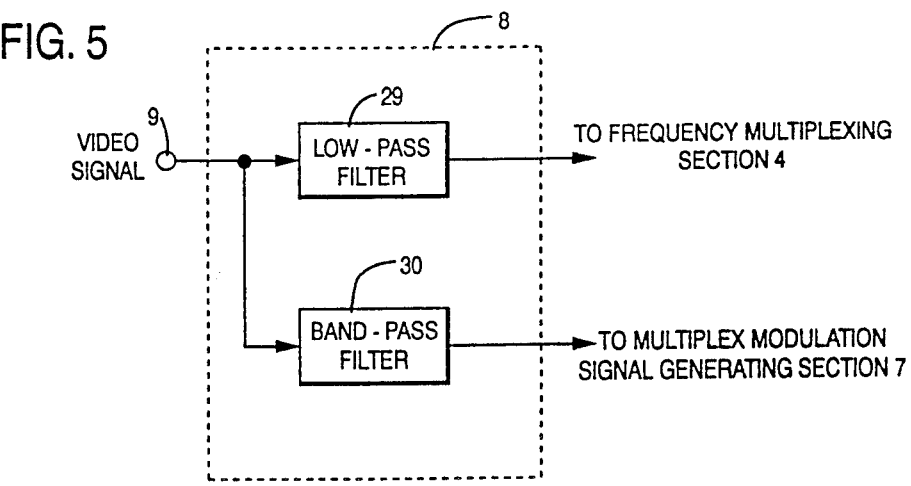
FIG. 5 is a block diagram of a main and sub video signal multiplexing section of the multiplex signal processing apparatus in an embodiment where the main and sub video signal multiplexing is realized through multiplexing of frequency when the video signal includes the high definition signal.

FIG. 5 is a block diagram of the main and subvideo signal separating section 8 in the case the video signal includes the signal for more excellent high resolution. The video signal entering from the terminal 9 is indicated as the signal 34 with a frequency bandwidth of 5.5 MHz of FIG. 7(a) because it includes the high resolution signal element. Here, the main video signal of 4.5 MHz which is the same as the video signal of a conventional satellite broadcast is extracted with a low-pass filter 29 shown in FIG. 5. The other signal from 4.5 MHz to 5.5 MHz is extracted as the subvideo signal with a band-pass filter 30. The signal 35 of FIG. 7(b) is the main video signal and the signal 36 is the subvideo signal. After the main video and subvideo signals are separated respectively, the main video signal is supplied to the frequency multiplexing section 4 and the subvideo signal to the multiplex modulation signal generating section 7. Moreover, in some cases, the sound modulation signal is time-division multiplexed into the main video signal.

Figure 6:
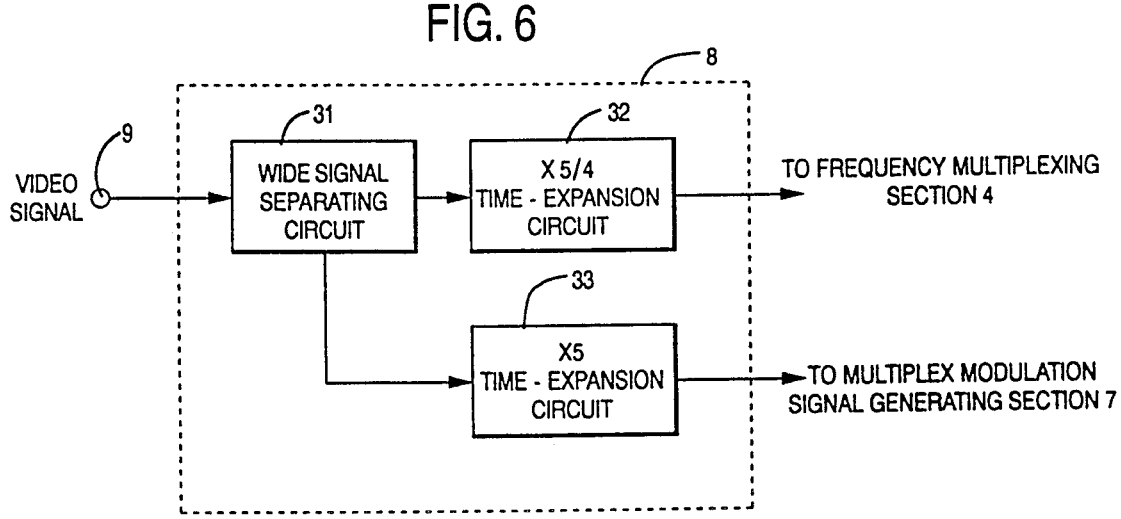
FIG. 6 is a block diagram of a main and sub video signal multiplexing section of the multiplex signal processing apparatus in an embodiment where the main and sub video signal multiplexing is realized through expansion on time axis when the video signal includes the signal for enlargement of aspect ratio.
Figure 8A:
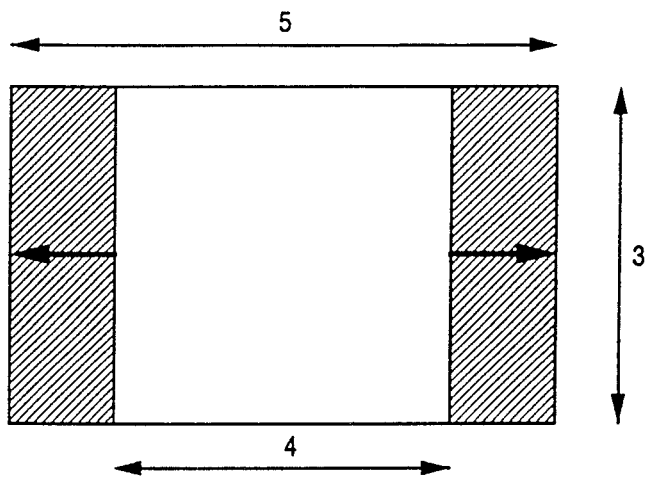
FIGS. 8a-8d are frequency spectrum in an embodiment of the multiplex signal processing apparatus which realizes main and sub video signal multiplexing through expansion on a time axis when the video signal includes a signal for the enlargement of the aspect ratio.
Figure 8B:
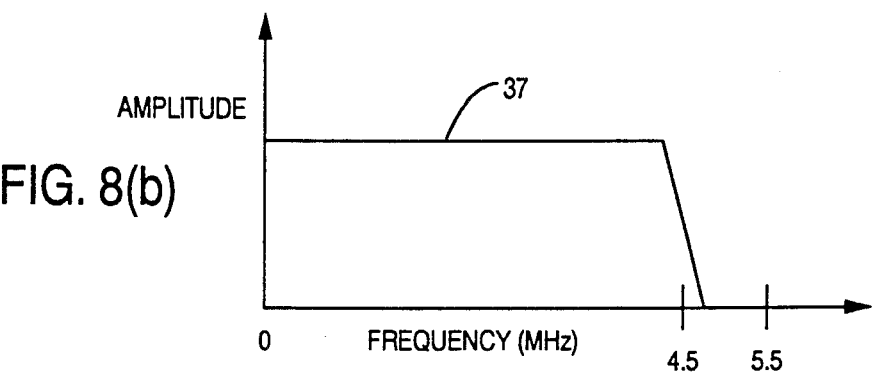
Figure 8C:
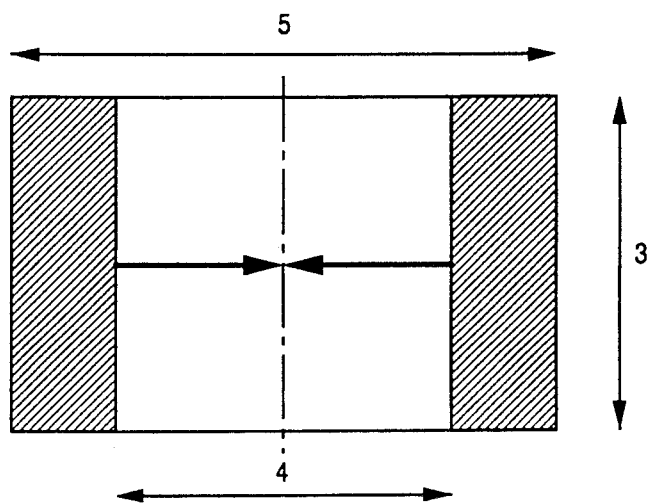
Figure 8D:
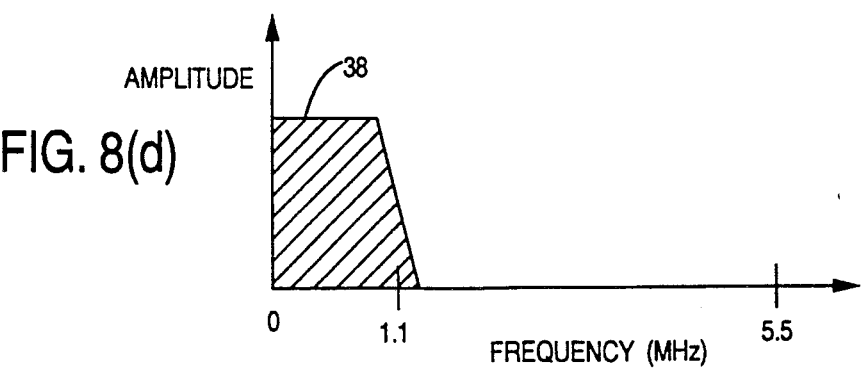

FIG. 6 is a block diagram of the main and subvideo signal separating section 8 where the video signal has the aspect ratio of 5:3 which is higher than the conventional signal. The video signal entering from the terminal 9 is the signal 34 with bandwidth of 5.5 MHz of FIG. 7(a) and it enters a wide signal separating circuit 31 and is separated into the signal having aspect ratio of 4:3 and the other signal shown in FIG. 8(a). The signal with the aspect ratio of 4:3 is the same as the video signal and is used as the main video signal, while the other signal as the subvideo signal. The main video signal enters a 5/4 times time-expansion circuit 32. Upon completion of 5/4 times time-expansion on the time axis, the frequency band becomes 5/4 times and the main video signal with bandwidth of 4.5 MHz similar to the conventional signal can be obtained. Other signal enters a 5 times time-expansion circuit 33. Upon completion of time-expansion of 5 times, the frequency band becomes 1/5 and thereby the subvideo signal with bandwidth of 1.1 MHz can be obtained as shown in FIG. 8(d). The signal 37 of FIG. 8(b) is the main video signal, while the signal 39 of FIG. 9(d) is the subvideo signal. After the video signal is separated into the main and sub video signals, the main video signal is supplied to the frequency multiplexing section 4 while the subvideo signal to the multiplex modulation signal generating section 7.

Figure 9:
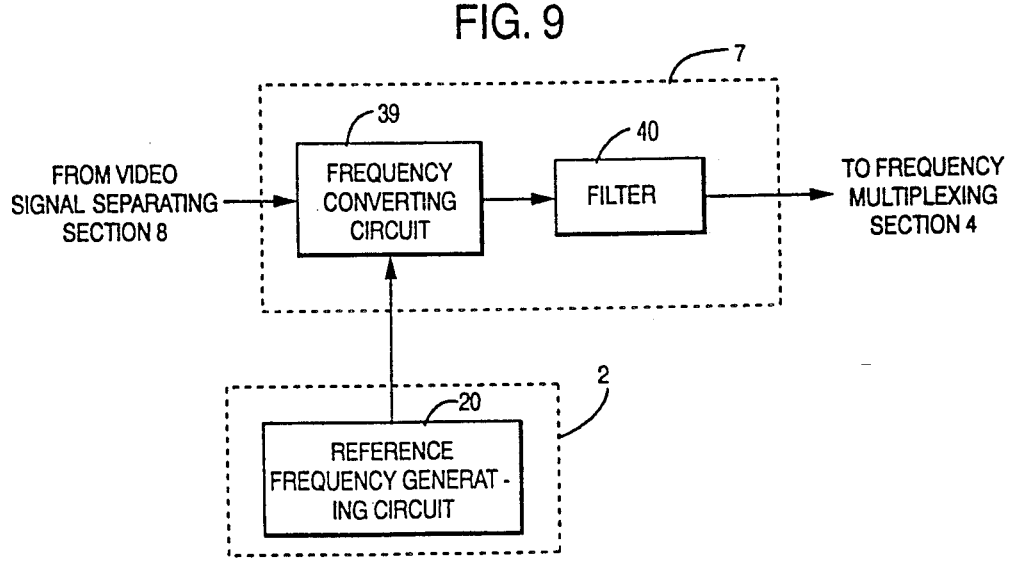
FIG. 9 is a block diagram of a multiplex modulation signal generating section of the multiplex signal processing apparatus in accordance with a first embodiment of the present invention where the multiplex modulation signal is generated by frequency conversion of the subvideo signal with the reference frequency of the sound modulation signal converting section.
Figure 10A:
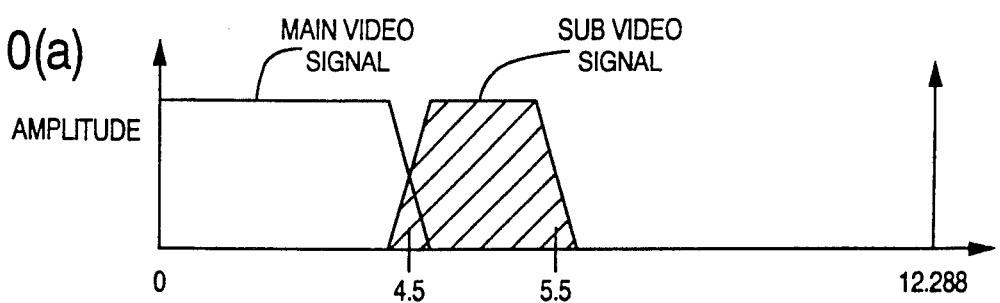
FIGS. 10a–10g are frequency spectrum in a first embodiment of the present invention where the multiplex modulation signal is generated by frequency conversion of the subvideo signal with the reference frequency signal of the sound modulation signal converting section.
Figure 10B:
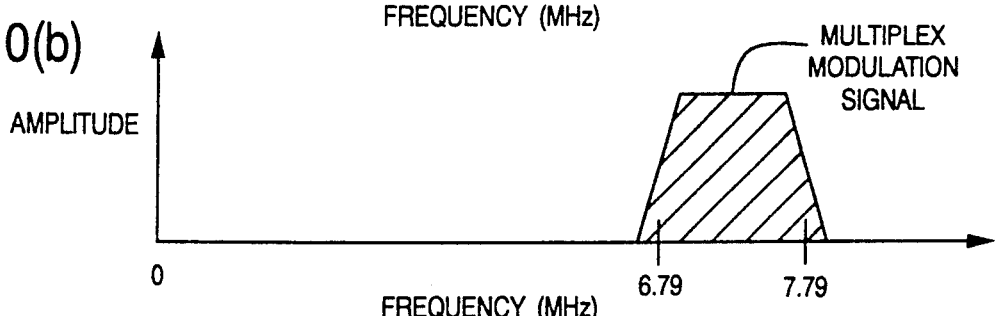
Figure 10C:
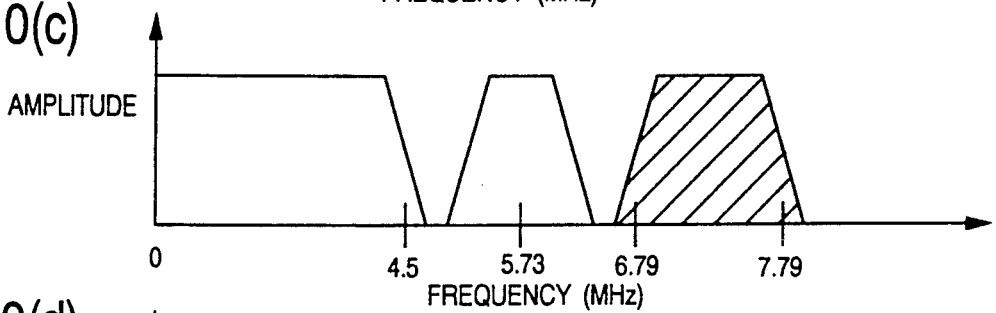

FIG. 9 is a first embodiment for generating the multiplex modulation signal. The subvideo signal extracted from the main and sub video signal separating section 8 is frequency-converted in a frequency converting circuit 39 by a reference signal which is the sound signal sampling frequency generated from the reference frequency generating circuit 20 forming the sound modulation signal converting section 2 in order to convert the subvideo signal for higher resolution explained in FIG. 5 into the multiplex modulation signal. As shown in FIG. 10(a), the reference frequency has the frequency of 12.288 MHz Therefore, as shown in FIG. 10(b), the subvideo signal is converted to the frequency band higher than the sound subcarrier from 6.79 MHz to 7.79 MHz. After elimination of unwanted elements with a filter 40, the signal is then supplied to the frequency multiplexing section 4. The multiplex modulation signal is frequency-multiplexed into the main video signal and sound subcarrier in the frequency multiplexing section 4 and converted to the modulation signal having the frequency allocation of FIG. 10(c).

Figure 10D:
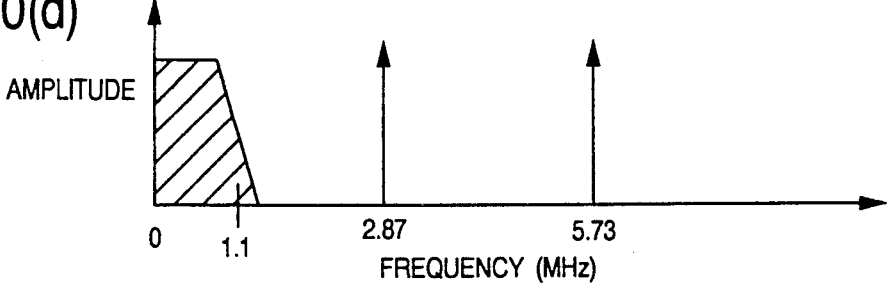
Figure 10E:
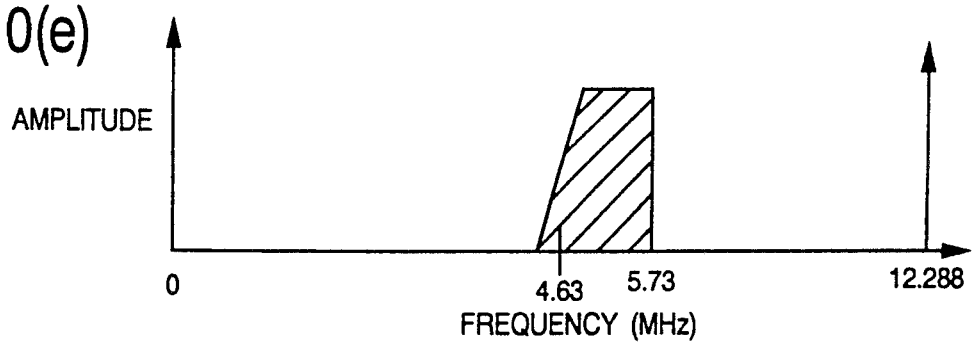
Figure 10F:
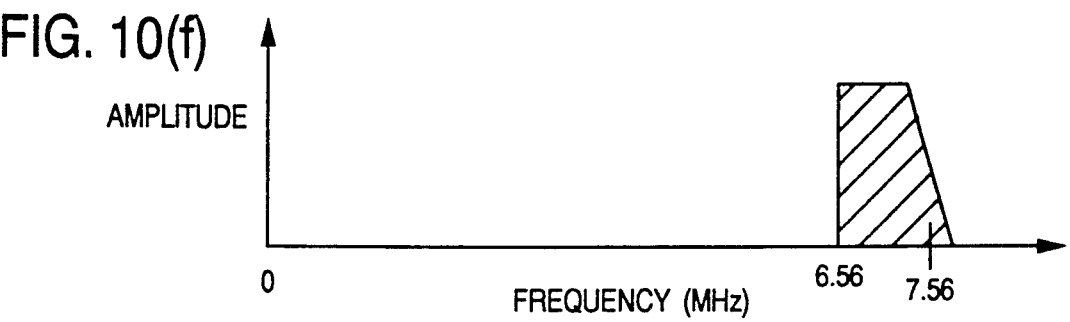
Figure 10G:
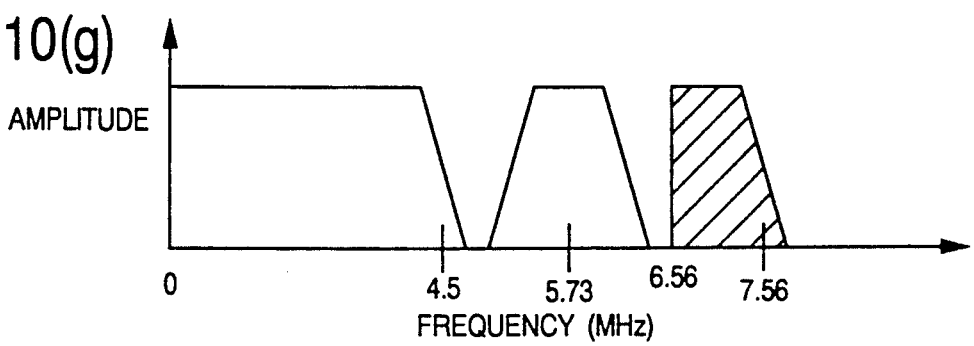

In order to convert the subvideo signal which is the signal for enlarging the aspect ratio explained in FIG. 6 to the multiplex modulation signal, the subvideo signal extracted from the main and sub video signal separating section 8 is previously frequency-converted, as shown in FIG. 10(d), with the sound subcarrier 5.73 MHz or the signal with frequency of 2.87 MHz which is equal to ½ thereof to obtain the subvideo signal of 4.63 MHz to 5.73 MHz as shown in FIG. 10(e). Moreover, as explained in regard to FIG. 9, the frequency band can be changed to 6.56 MHz to 7.66 MHz of the multiplex modulation signal of FIG. 10(f) by frequency conversion with the reference frequency. Thereby, the frequency can be converted to the higher frequency without overlap with the sound subcarrier. Thereafter, the modulation signal with frequency allocation of FIG. 10(g) can be produced by the frequency multiplexing section 4.

Moreover, in some cases, only the higher frequency element of side panel is transmitted in the video signal having the aspect ratio which is larger than that of the ordinary signal. In this case, as explained previously, the higher frequency element of side panel is extracted to transmit as the subvideo signal.

Figure 11:
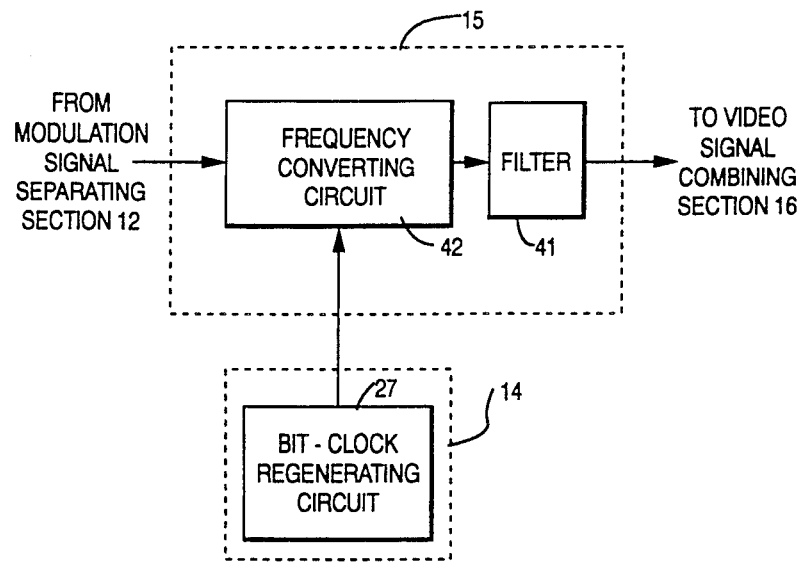
FIG. 11 is a block diagram of the multiplex modulation signal demodulating section of the multiplex signal processing apparatus in accordance with a first embodiment of the present invention where the subvideo signal is recovered by frequency conversion of the multiplex modulation signal with the bit clock of the sound signal regenerating section.

FIG. 11 is a structure to demodulate the multiplex modulation signal explained in regard to FIG. 9. The multiplex modulation signal extracted from the modulation signal separating section 12 which separates the main video signal, sound subcarrier and multiplex modulation signal is converted to the signals of FIG. 10(b),(c) through the frequency conversion in a frequency conversion circuit 42 with the clock, for example, 12.288 MHz of the bit clock regenerating circuit 27 forming the sound signal regenerating circuit 14. After elimination of unwanted signals with a filter 41, the subvideo signal for high resolution is directly supplied, if it is detected, to the main and subvideo signal combining section 15 to regenerate the video signal. However, the signal for enlargement of aspect ratio, if it is detected, is converted to the signal of 1.1 MHz or less through the frequency conversion with the sound subcarrier or the signal having the frequency equal to ½ thereof and then supplied to the main and subvideo signal combining section 16.

As explained previously, the first embodiment of the present invention provides an advantage that the multiplex modulation signal is generated by converting the sub video signal to the frequency band which is higher than the sound subcarrier, the reference frequency to be used for sampling of sound signal is used to regenerate the subvideo signal from such multiplex modulation signal and thereby high definition signal can be obtained without adding an oscillator for conversion and the circuit structure can be simplified because the bit clock signal being used for sound signal regenerating circuit can directly be used even in the demodulation.

Figure 12:
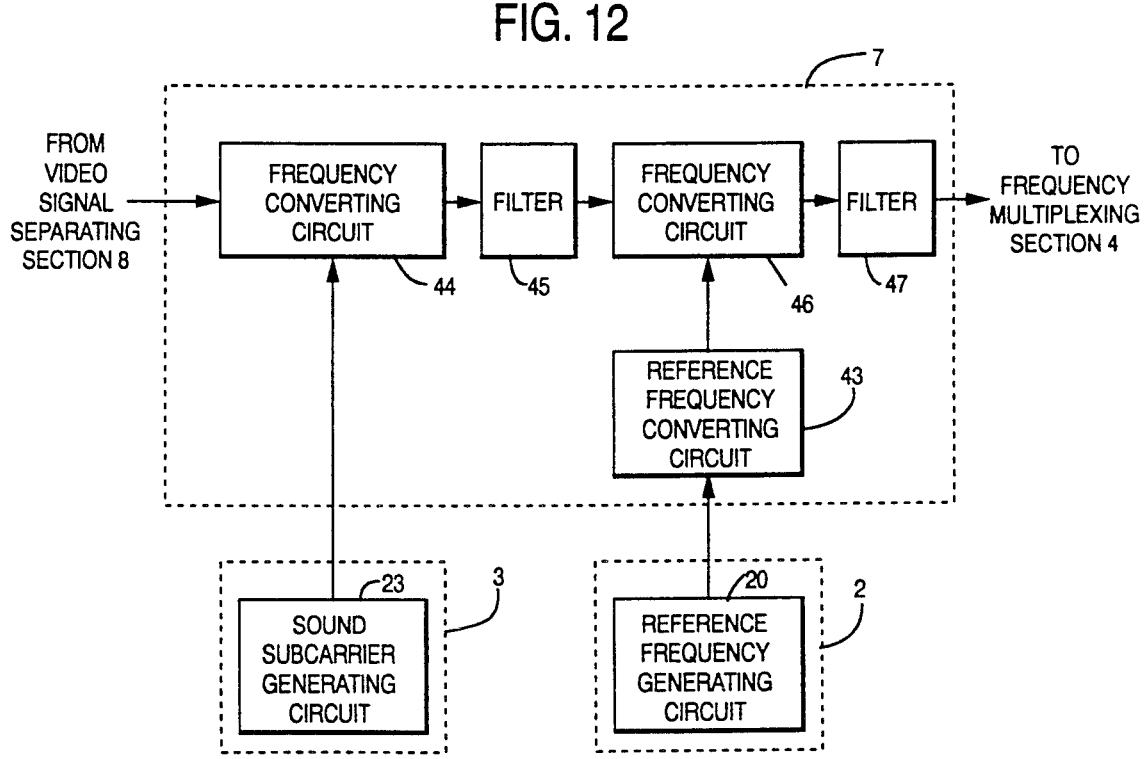
FIG. 12 is a block diagram of the multiplex modulation signal generating section of the multiplex signal processing apparatus in accordance with a second embodiment of the present invention where the multiplex modulation signal is generated by frequency conversion of the subvideo signal with the sound subcarrier and the reference frequency signal of the sound modulation signal regenerating section.
Figure 13A:
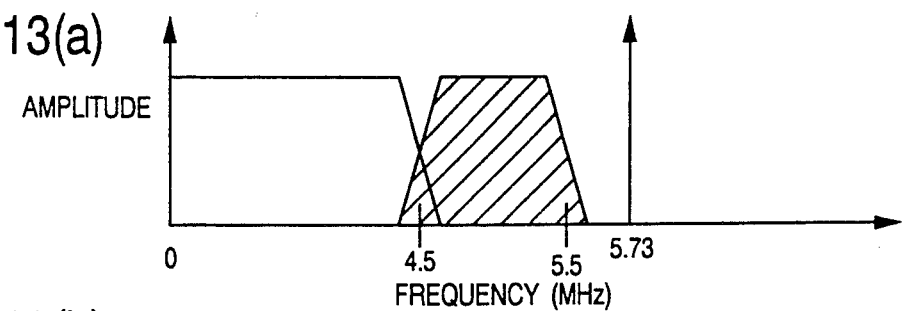
FIGS. 13a–13d are frequency spectrum in accordance with a second embodiment of the present invention where the multiplex modulation signal is generated by frequency conversion of the subvideo signal with the sound subcarrier and the reference frequency signal of the sound modulation signal regenerating section.
Figure 13B:
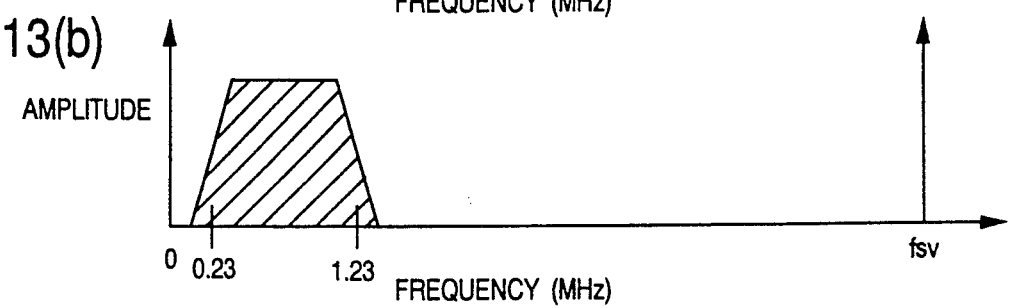
Figure 13C:
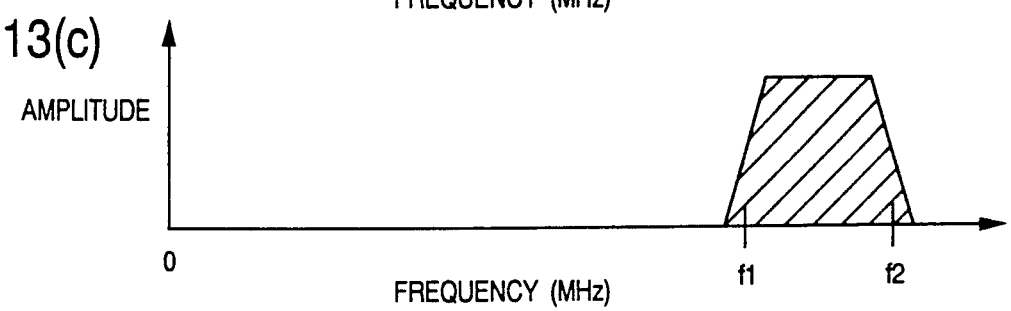
Figure 13D:
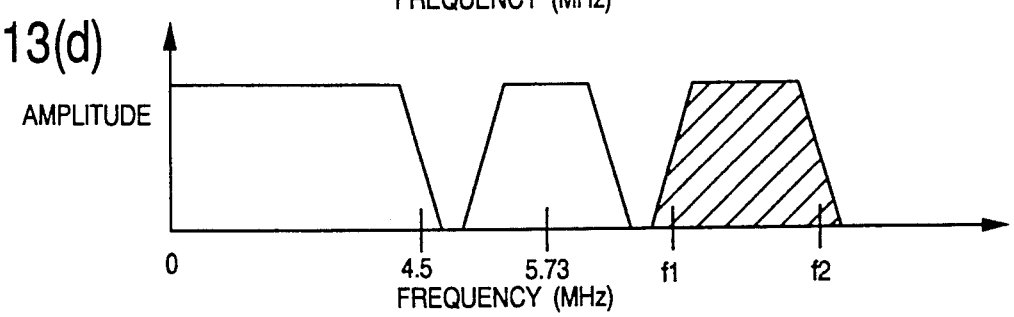

FIG. 12 a second embodiment for generating multiplex modulation signal. In order to convert the subvideo signal for high resolution display explained in regard to FIG. 5 to the multiplex modulation signal, the multiplex modulation signal extracted from the main and subvideo signal separating section 8 is once frequency-converted to a low frequency in a frequency conversion circuit 44 with the carrier generated for transmission of sound signal from the sound subcarrier generating section 23. FIG. 13(a) indicates the frequencies of main video signal, subvideo signal and sound subcarrier. Moreover, FIG. 13(b) indicates the frequency spectrum of subvideo signal frequency-converted by the sound subcarrier. Thereafter, it is supplied to a frequency converting circuit 46 passing through a filter 45 for eliminating unwanted signal. Meanwhile, the reference frequency generated from the reference frequency generating circuit 20 is once divided and multiplied in a reference frequency converting circuit 43 to be converted to the frequency equal to an integer time of the sound sampling frequency, for example, to 8.19 MHz, 6.14 MHz and is then supplied to a frequency converting circuit 46. The signal $F_{SV}$ indicated in FIG. 13(b) is supplied from the reference frequency converting circuit 43 and the subvideo signal is converted, in the frequency band from $f_1$ to $f_2$ of FIG. 13(c), to the multiplex modulation signal. When $F_{SV}=8.19$ MHz, $f_1=6.96$ MHz, $f_2=7.96$ MHz, and when $F_{SV}=6.16$ MHz, $f_1=6.39$ MHz, $f_2=7.39$ MHz. In any case, the signal is converted to the frequency band higher than the sound subcarrier. The multiplex modulation signal output from the frequency converting circuit 46 is supplied to the frequency multiplexing section 4 after elimination of unwanted signal with a filter 47. The frequency-multiplexed modulation signal has the spectrum shown in FIG. 13(d).

In case the subvideo signal for enlargement of aspect ratio explained in regard to FIG. 6 is converted to the multiplex modulation signal, the subvideo signal extracted from the main and subvideo signal separating section 8 has the frequency of 1.1 MHz or less. Therefore, it does not require the frequency conversion by the sound subcarrier of FIG. 13(a) and it may be input from the filter 45 of FIG. 12. Moreover, in the video signal having the aspect ratio which is larger than the ordinary value, it is also probable that only the higher frequency element of side panel is transmitted. In such a case, the higher frequency element in the side panel is extracted and is then transmitted as the subvideo signal as explained previously.

Figure 14:
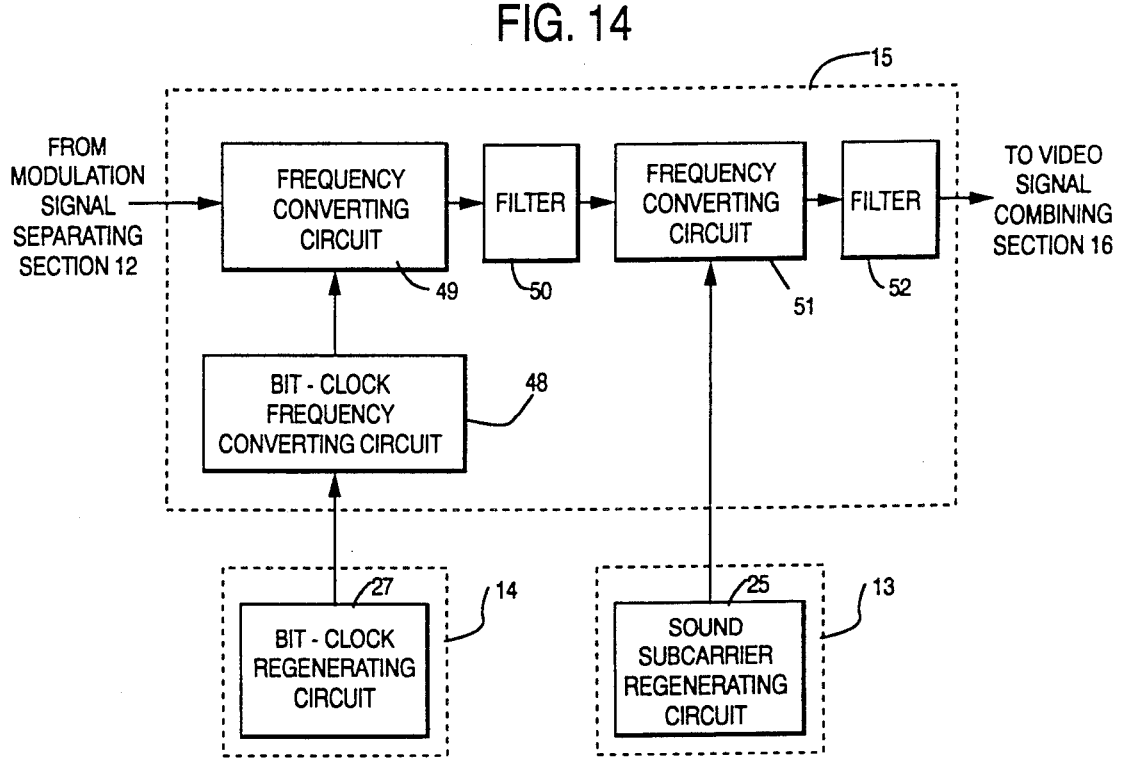
FIG. 14 is a block diagram of the multiplex modulation signal demodulating section of the multiplex signal processing apparatus in accordance with a second embodiment of the present invention where the subvideo signal is regenerated by frequency conversion of the multiplex modulation signal with the sound subcarrier and bit clock of the sound signal regenerating section.

FIG. 14 is a structure for demodulating the multiplex modulation signal explained in regard to FIG. 12. On the other hand, an output signal of a bit clock frequency converting circuit 48 for frequency conversion to $f_{sv}$ which is an integer times of sampling frequency of sound signal is supplied to a frequency conversion circuit 49 from the bit clock regenerating circuit 27 for regenerating the bit clock (2.048 MHz) which is necessary for decoding of the PCM sound signal. Thereby, the multiplex modulation signal can be frequency-converted to a lower frequency. It is shown in FIG. 13(b). Thereafter, in the case the multiplex modulation signal includes the signal for high resolution, it is frequency converted in a frequency converting circuit 51 with the sound subcarrier of the sound subcarrier regenerating circuit 25 and it becomes the subvideo signal after passing through a filter 52 and is then supplied to the main and subvideo signal combining section 16. However, in the case where the multiplex modulation signal includes the signal for enlargement of the aspect ratio, it is directly supplied to the main and subvideo signal combining section 16.

This embodiment has the advantage that the frequency of signal to be used for frequency conversion during the regenerating operation is accurately regenerated and a new regenerating circuit to use the sound subcarrier regenerated by the conventional receiver and the bit clock signal is no longer necessary.

Figure 15:
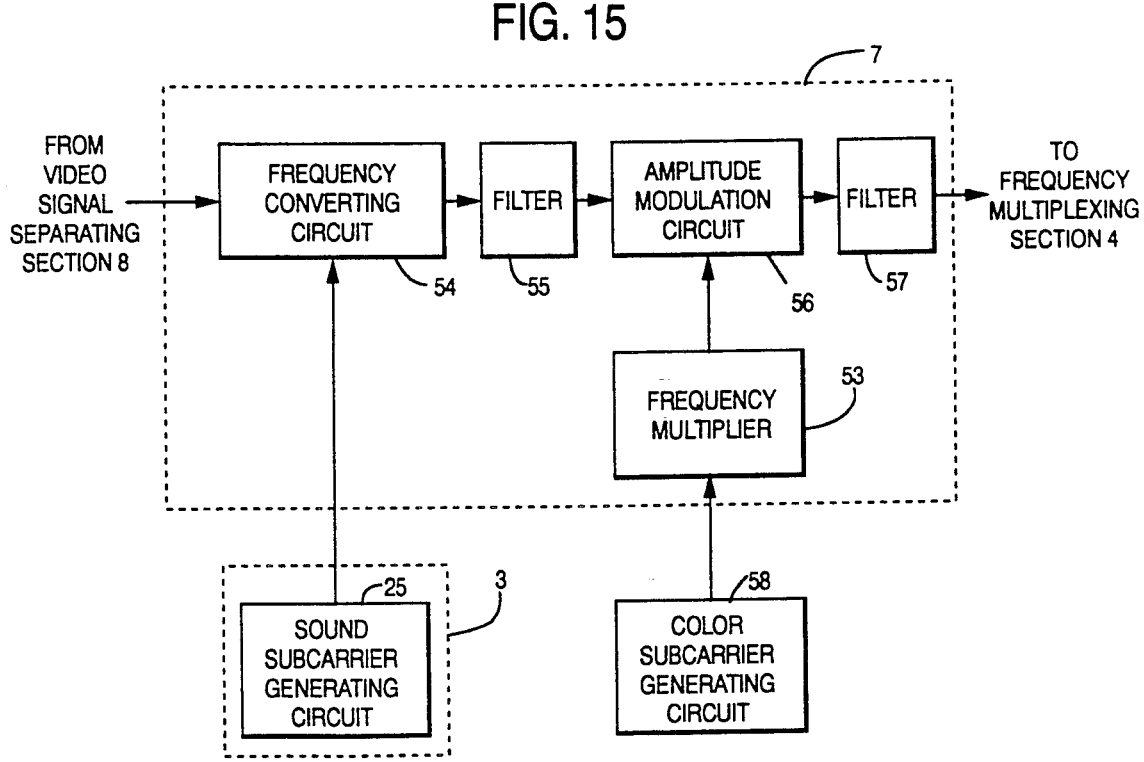
FIG. 15 is a block diagram of the multiplex modulation signal generating section of the multiplex signal processing apparatus in accordance with a third embodiment of the present invention where, after frequency conversion of the subvideo signal with the sound subcarrier, the multiplex modulation signal is generated by amplitude modulation of the color subcarrier.
Figure 16A:
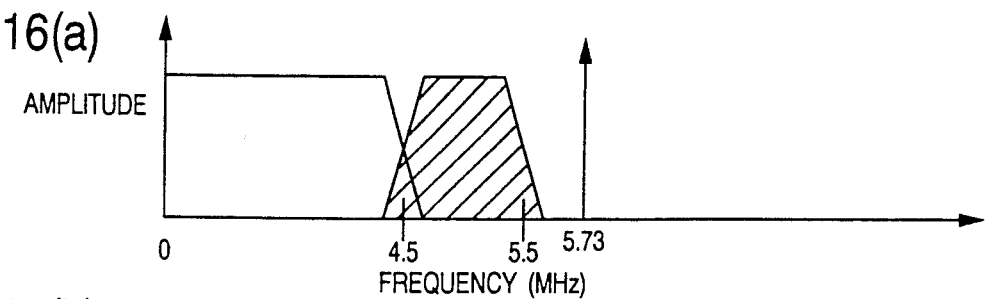
FIGS. 16a–16e are spectrum diagram in accordance with a third embodiment of the present invention where, after frequency conversion of the subvideo signal with the sound subcarrier, the multiplex modulation signal is generated by amplitude modulation of the color subcarrier.
Figure 16B:
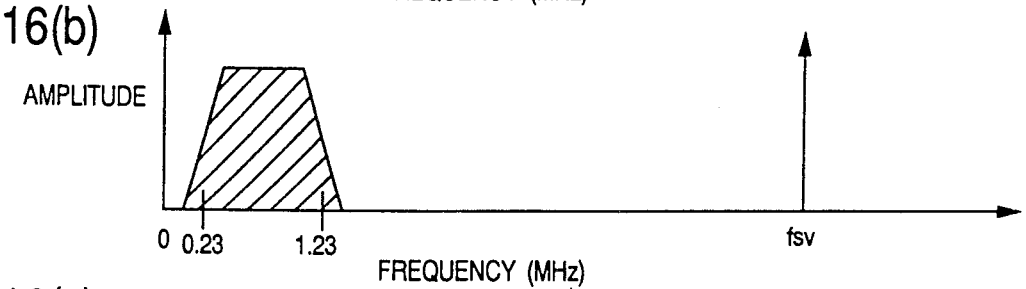
Figure 16C:
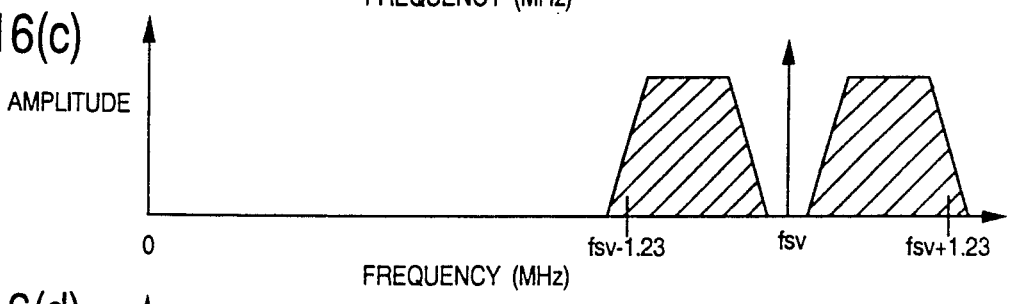
Figure 16D:
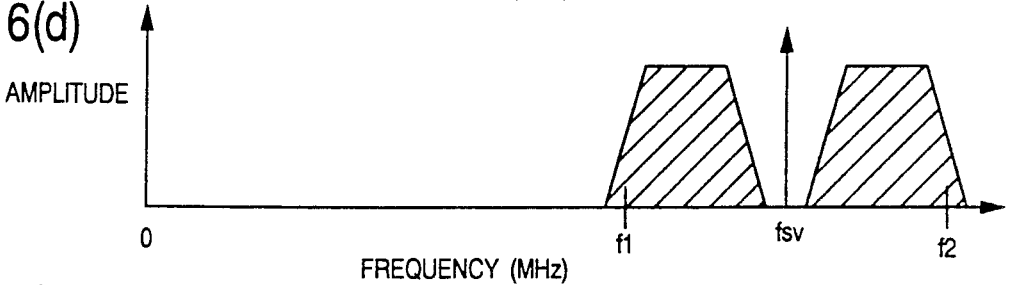
Figure 16E:
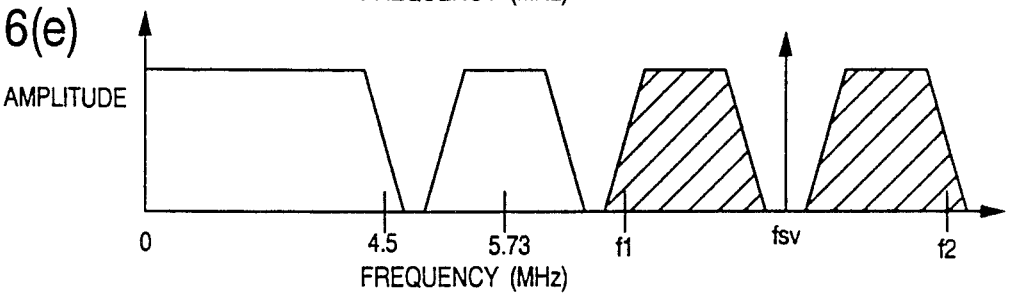

FIG. 15 is a third embodiment for producing the multiplex modulation signal. In order to convert the subvideo signal for realizing higher resolution explained in regard to FIG. 5 to the multiplex modulation signal, the subvideo signal extracted from the main and subvideo signal separating section 8 is converted, in a frequency converting circuit 54, to the frequency band of FIG. 16(b) from that of FIG. 16(a) with the sound subcarrier supplied from the sound subcarrier generating circuit 25. It is similar to the second embodiment explained in regard to FIG. 12. Thereby, the subvideo signal is converted to 1.23 MHz from 0.23 MHz. Thereafter, the subvideo signal is supplied to an amplitude modulation circuit 56 as the modulation signal after elimination of unwanted signals with a filter 55. Meanwhile, as the video subcarrier of amplitude modulation circuit 56, a color subcarrier forming the video signal is used and the signal obtained by multiplying the color subcarrier output from a color subcarrier generating circuit 58 with a multiplying circuit 53 is supplied. In this case, the frequency of video subcarrier is doubled to 7.16 MHz. Only the multiplex modulation signal is selected from an output of this amplitude modulation circuit 56 with a filter 57 and is supplied to the frequency multiplexing section 4. $f_{sv}$ in FIG. 16(b) is the video subcarrier supplied to the amplitude modulation circuit 56 and the multiplex modulation signal generated by amplitude modulation of video subcarrier with the subvideo signal is shown in FIG. 16(c). This signal is a DSB signal having the frequency band of from 5.93 MHz to 8.39 MHz. In this case, it is probable that the lower side band overlaps on the spectrum of the sound subcarrier, generating interference. In the case the transmission frequency band for satellite broadcasting is limited, it is necessary to raise the transmission band of filter 57 so that the VSB or SSB spectrum shown in FIG. 16(d) can be obtained. As explained above, the multiplex modulation signal is frequency-multiplexed to the frequency band higher than the sound subcarrier as shown in FIG. 16(e). For instance, the multiplex modulation signal is converted to VSB with $f_1=6.4$ MHz, $f_2=8.39$ MHz so that the it does not overlap on the spectrum of sound subcarrier.

For conversion of the subvideo signal as the signal for the enlargement of the aspect ratio explained in regard to FIG. 6 to the multiplex modulation signal, since the subvideo signal extracted from the main and subvideo signal separating section 8 is already frequency-converted to a low frequency of 1.1 MHz as shown in FIG. 8(d), the subvideo signal can be supplied to the amplitude modulation circuit 56 through the filter 55 without frequency conversion with the sound subcarrier. In this case, the maximum frequency $f_2$ of the multiplex modulation signal becomes 8.26 MHz. Moreover, in the video signal having the aspect ratio which is larger than the ordinary value, it is also probable that only the higher frequency element of the side panel is transmitted. In such a case, the higher frequency element in the side panel is extracted and is then transmitted as the subvideo signal as explained previously.

Figure 17:
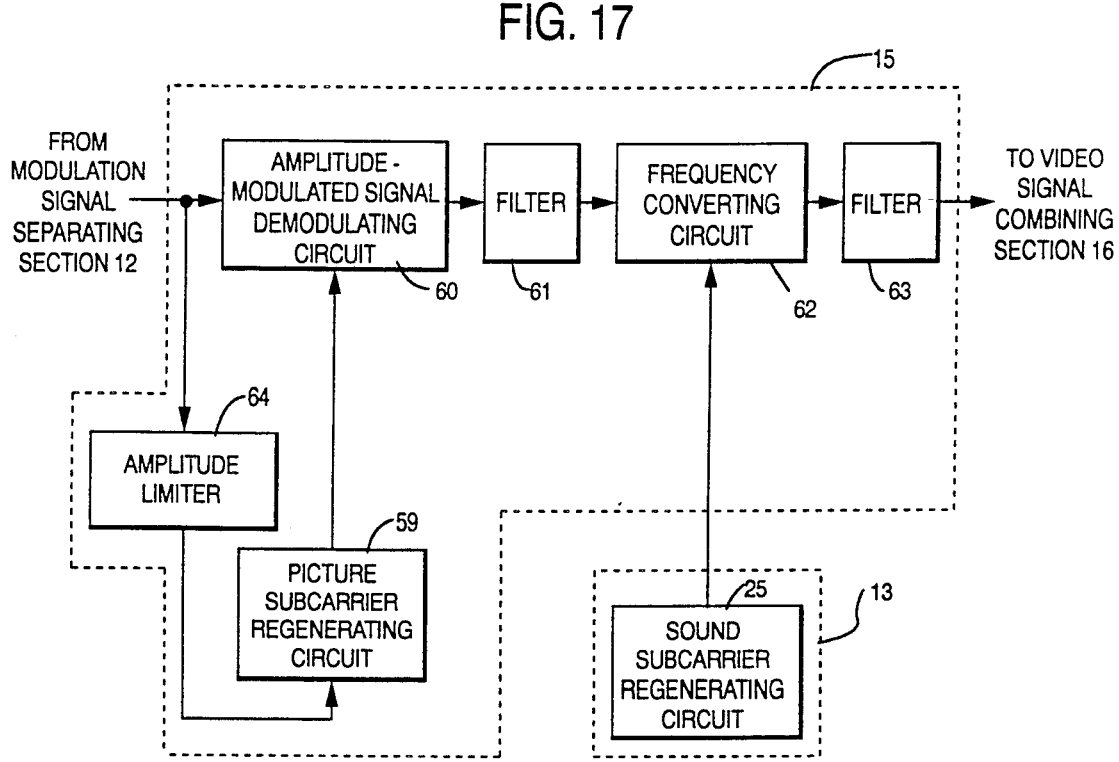
FIG. 17 is a block diagram of the multiplex modulation signal demodulating section of the multiplex signal processing apparatus in accordance with a third embodiment of the present invention where, after demodulation of the multiplex modulation signal generated by amplitude modulation of the color subcarrier, the subvideo signal is regenerated by frequency conversion with the sound subcarrier.

FIG. 17 is a structure for demodulating the multiplex modulation signal explained in regard to FIG. 15. The multiplex modulation signal extracted from the modulation signal separating section 12 for separating the main video signal, sound subcarrier and multiplex modulation signal is supplied to an amplitude modulation signal demodulating circuit 60. Meanwhile, the multiplex modulation signal is simultaneously supplied to an amplitude limiter 64, suppressing the amplitude modulation element and is then supplied to a video subcarrier regenerating circuit 59. The video subcarrier regenerating circuit 59 recovers the video subcarrier in the same frequency as the carrier included in the multiplex modulation signal and supplies it to the amplitude modulation signal demodulating circuit 60. The amplitude modulation signal demodulating circuit 60 regenerates the multiplex signals included in the video subcarrier by the synchronous detection, then eliminates unwanted signal with a filter 61 and then supplies the signal to a frequency converting circuit 62. After elimination of unwanted signal with the filter 61, the demodulated signal is frequency converted to the frequency band fron 0.23 MHz to 1.23 MHz as shown in FIG. 16(b). To the frequency converting circuit 62, the sound subcarrier regenerated by the sound subcarrier regenerating circuit 25 is supplied. Thereby, the multiplex signal is frequency-converted to the frequency band from 4.5 MHz to 5.5 MHz and becomes the subvideo signal in the frequency band of FIG. 16(a). A filter 63 is used for eliminating unwanted signals generated during the frequency conversion.

In the case the multiplex modulation signal is the signal for high resolution, it is directly supplied to the main and subvideo signal combining section 16 to regenerate the video signal. However, it is the signal for the enlargement of the aspect ratio, an output of the filter 61 is supplied to the main and subvideo signal combining section 16.

As explained above, according to this embodiment, the multiplex signal can be transmitted, without generating interference to the sound subcarrier, by amplitude-modulating the subvideo signal with the video subcarrier and by the converting of the video subcarrier obtained by amplitude modulation of the subvideo signal to the frequency band higher than the voice subcarrier. Moreover, since the video subcarrier uses the frequency equal to double the frequency of the color subcarrier, it does not easily receive the hormonic interference of the color subcarrier due to the secondary distortion of the video circuits, etc. In addition, the signal is transmitted with double sidebands and thereby S/N ratio can thereby be improved. During the demodulation, the carrier which has eased orthogonal distortion in the demodulation process can be regenerated easily because the video subcarrier is regenerated from the multiplex modulation signal and therefore the demodulating circuit can be simplified.

Figure 18:
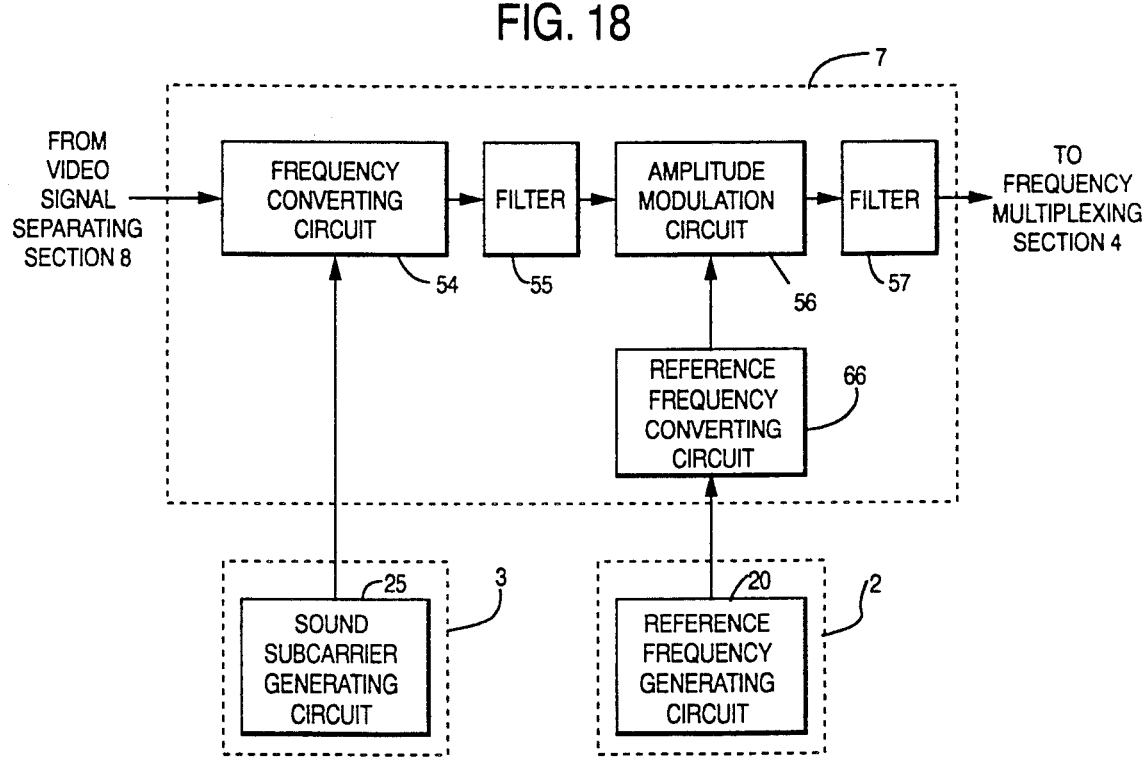
FIG. 18 is a block diagram of the multiplex modulation signal generating section of the multiplex signal processing apparatus in accordance a fourth embodiment of the present invention where, after frequency conversion of the subvideo signal with the sound subcarrier, the multiplex modulation signal is generated by amplitude modulation of the reference frequency signal of the sound modulation signal converting section.

FIG. 18 is a fourth embodiment for generating the multiplex modulation signal. In order to convert the subvideo signal for realizing higher resolution explained in regard to FIG. 5 to the multiplex modulation signal, the subvideo signal extracted from the main and subvideo signal separating section 8 is frequency-converted, in a frequency converting circuit 54, with the sound subcarrier supplied from the sound subcarrier generating circuit 25. In this processing, operations are the same as those in FIG. 15 and a detailed explanation thereof has been omitted.

After elimination of unwanted signals with a filter 55, the frequency-converted signal is supplied to an amplitude modulation circuit 56 as the modulation signal. Meanwhile, the video subcarrier of amplitude modulation circuit 56 is divided and multiplied in frequency by a reference frequency converting circuit 66 using the signal generated by the reference frequency generating circuit 20 forming the sound modulation signal converting section 2 and is then supplied to the amplitude modulation circuit 56. The reference frequency becomes 7.14 MHz after multiplication of (7/12) in case it has been 12.288 MHz. The amplitude-modulated multiplex modulation signal is supplied to the frequency multiplexing section 4 as in the case of FIG. 15.

As explained above, according to this embodiment, the video subcarrier of multiplex modulation signal is generated from the reference frequency of the sound modulation signal converting section. Since the reference frequency generates the sampling frequency to use the sound signal for PCM encoding, the devided frequency already exists. Therefore, the video sub carrier of multiplex modulation signal can be generated by the fixed multiplication, for example, 8 times multiplication, using a part of the fixed division, for example, 1/12 division. Accordingly, the circuit structure is not enlarged. Moreover, the circuit shown in FIG. 17 can be used as the receiving circuit for the fourth embodiment.

Figure 19:
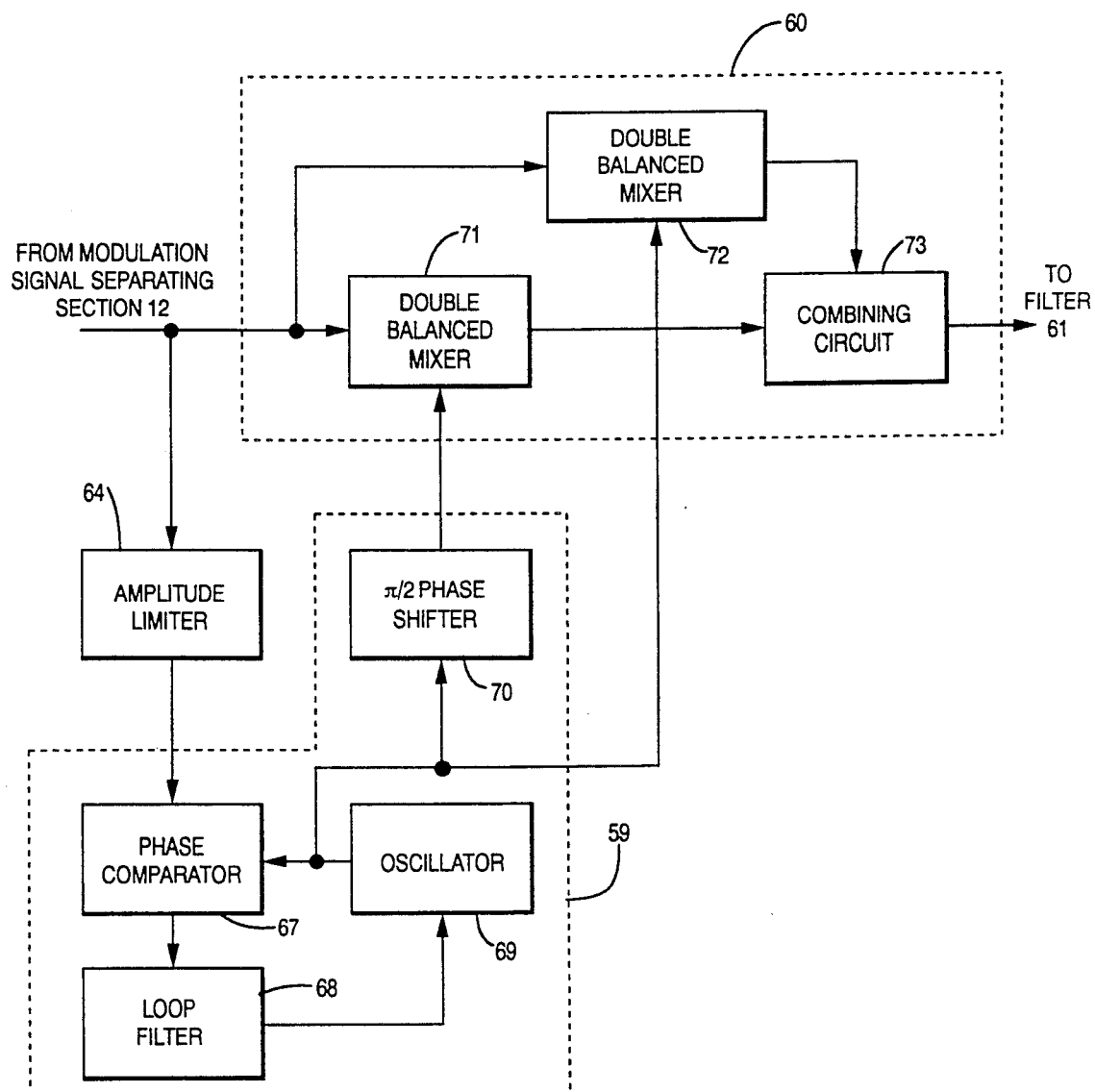
FIG. 19 is a block diagram of the multiplex modulation signal demodulating section of the multiplex signal processing apparatus in accordance with a fourth embodiment of the present invention where, after demodulation of the multiplex modulation signal generated by amplitude modulation of the reference frequency signal of the sound modulation signal converting section, the subvideo signal is regenerated by frequency covnersion with the sound subcarrier.

FIG. 19 indicates a practical example of the amplitude modulation signal demodulating circuit 60 and video subcarrier regenerating circuit 59 of FIG. 17. The multiplex modulation signal entering from the modulation signal separating section 12 is kept constant in amplitude through suppression of amplitude modulation elements in the amplitude limiter 64 and then enters the video subcarrier regenerating circuit 59. This video subcarrier regenerating circuit 59 is formed by a phase locked loop circuit consisting of a phase comparator 67, an oscillation circuit 69 and a loop filter 68 and a $\pi/2$ phase shifter 70, and the oscillation circuit 69 operates in frequency phase synchronization with the output signal of amplitude limiter 64. The oscillation output thereof enters a $\pi/2$ phase shifter 70 and is then shifted in phase and enters a double balanced mixer 71. In addition, the oscillation signal from the oscillation circuit 69 is input to a double balanced mixer 72. The oscillation signals supplied to the double balanced mixers 71, 72 are orthogonal to each other, and therefore outputs of respective mixers are orthogonal outputs of multiplex modulation signal. The output signals thereof are combined in a combining circuit 73 and then supplied to the filter 61.

As explained above, this embodiment provides the advantage that the phase locked loop circuit is used for regenerating the video subcarrier from the video modulation signal and the circuit for demodulation in orthogonal to the video subcarrier is also added and therefore demodulation output can be kept constant even when the phases of phase locked loop circuit and $\pi/2$ phase shifter vary.

Figure 20:
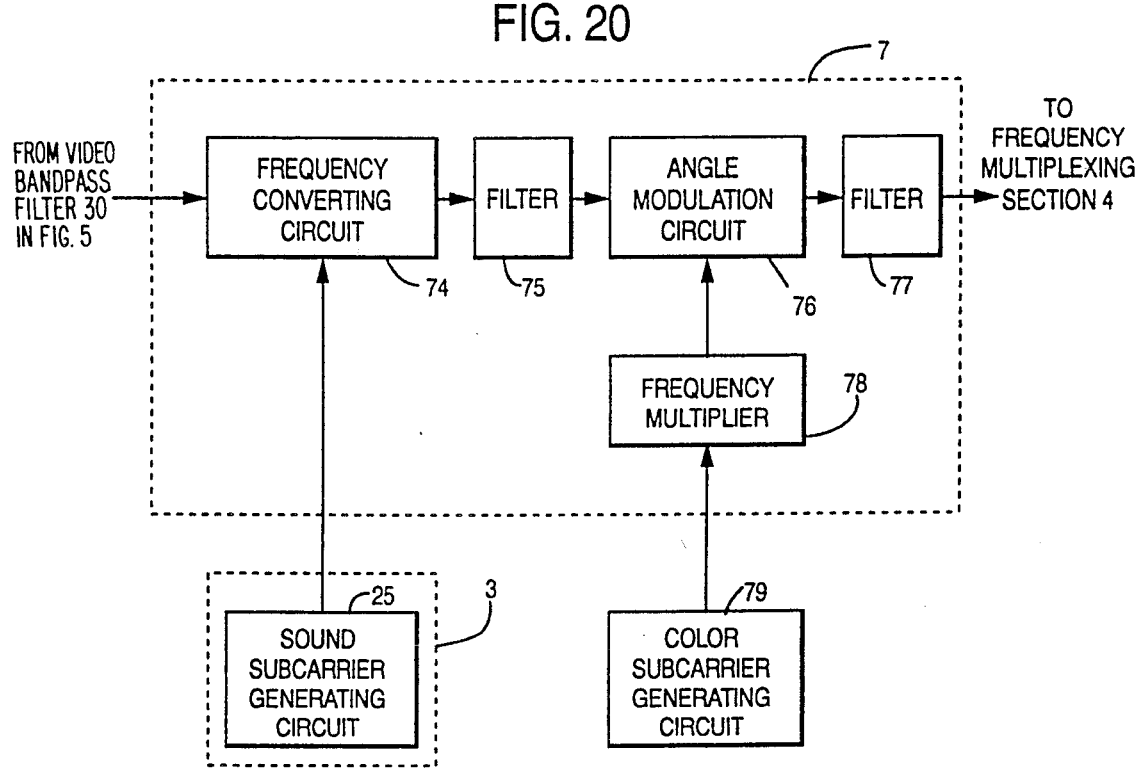
FIG. 20 and FIG. 20A are each a block diagram of the multiplex modulation signal generating section of the multiplex signal processing apparatus in accordance with a fifth embodiment of the present invention where, after frequency conversion of the subvideo signal with the sound subcarrier, the multiplex modulation signal is generated by angle modulation of the color subcarrier.
Figure 21A:
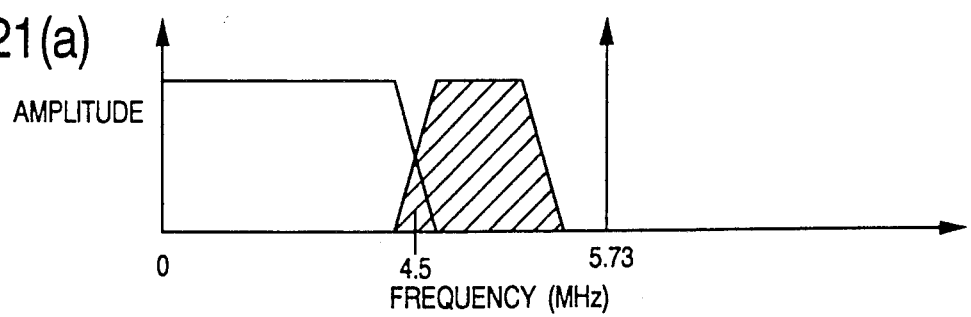
FIGS. 21a–21d are frequency spectrum in a accordance with fifth embodiment of the present invention where, after frequency conversion of the subvideo signal with sound subcarrier, the multiplex modulation signal is generated by angle modulation of the color subcarrier.
Figure 21B:
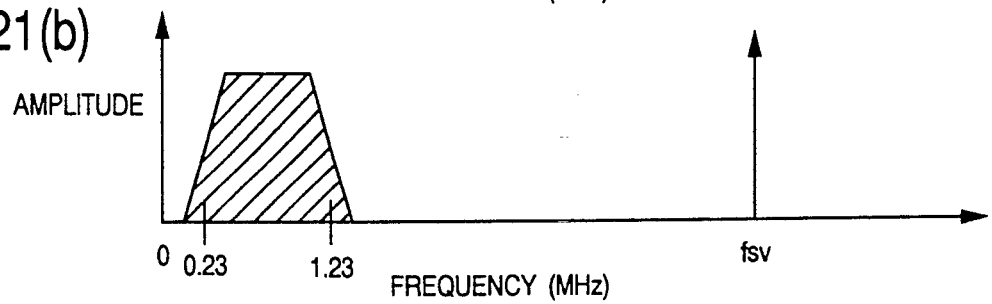
Figure 21C:
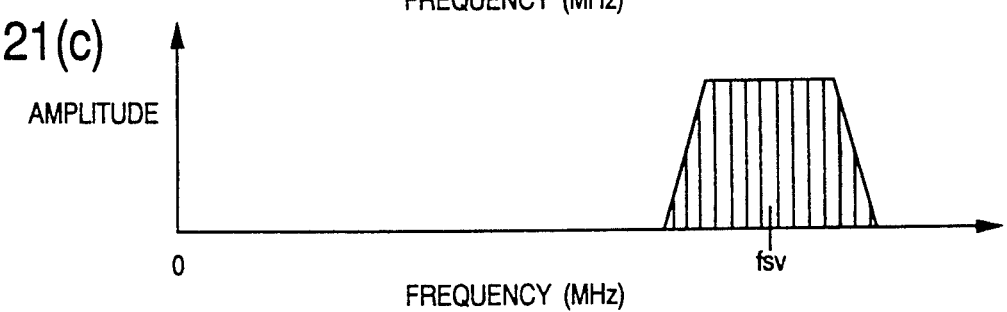

FIG. 20 is a fifth embodiment for generating the multiplex modulation signal. In order to convert the subvideo signal for realizing higher resolution explained in regard to FIG. 5 to the multiplex modulation signal, the subvideo signal extracted from the main and subvideo signal separating section 8 is frequency-converted in the case of FIG. 15 by a frequency converting circuit 74 and the sound subcarrier generating circuit 25. Thereby, the frequency is converted from the frequency band of FIG. 21(a) to that of FIG. 21(b). Accordingly, the subvideo signal is converted to 1.23 MHz from 0.23 MHz. After elimination of unwanted signals with a filter 75, the frequency-converted signal is supplied to an angle modulation circuit 76 as the modulation signal. Meanwhile, as the video subcarrier of angle modulation circuit 76, the signal obtained by multiplying the color subcarrier output from a color subcarrier generating circuit 79 with a frequency multiplier 78 using the color subcarrier forming the video signal is supplied. In this case, the frequency of video subcarrier becomes 7.16 MHz by ×2 multiplication or becomes 10.74 MHz by ×3 multiplication. Only the multiplex modulation signal is selected with the filter 77 from the output of such an angle modulation circuit 76 and it is supplied to the frequency multiplexing section 4. $f_{sv}$ in FIG. 21(b) is the video subcarrier supplied to the angle modulation circuit 76 and the multiplex modulation signal generated by angle modulation of this video subcarrier with the subvideo signal is shown in FIG. 21(c). The frequency band of this signal has the spectrum around the video subcarrier. The multiplex modulation signal is frequency multiplexed with the main video signal and sound subcarrier and converted to that shown in FIG. 21(d). Meanwhile, in the case of the angle modulation signal, the signal to noise ratio (S/N) is improved depending on the FM improvement degree rather than the carrier to noise ratio (S/N). A degree of FM improvement of angle modulation is expressed as follow. When maximum frequency deviation is $\Delta f$, maximum frequency of modulation signal is $fm$ and occupation bandwidth is B, Degree of FM improvement=

$$10 \log \left[ \frac{3}{2} \left( \frac{\Delta f}{fm} \right)^2 \cdot \left( \frac{B}{fm} \right) \right] \quad (1)$$

$$B = \Delta f + 2 \cdot f_m \ldots \quad (2)$$

This degree of FM improvement indicates a degree of improvement of the S/N ratio. For elimination of overlap of spectrum of video carrier on the spectrum of sound subcarrier, since the video subcarrier is 7.16 MHz in the case of ×2 multiplication, the difference is 0.76 MHz, or since the video subcarrier is 10.74 MHz in the case of ×3 multiplication, the difference is 4.34 MHz.

Meanwhile, the occupied bandwidth $f_B$ and allowable value in the case the modulation signal multiplexed by angle modulation of video signal is angle-modulated to the main carrier can be expressed by the following equation. When ½ of occupied bandwidth of only the video signal is $f_b$, and the modulation index of video subcarrier is m and the frequency shift of main carrier by the video subcarrier is $f_{sd}$, $$f_B = 2 \cdot f_b \cdot \left( 1 + \frac{m^2}{2} \cdot \frac{f_b^2}{f_b^2 - f_{sd}^2} \right) \quad (3)$$

This theory is explained in the Paragraph 5, "Effective Application of Radiowave in the Satellite Communication System and Technical Conditions Required for Management of the Same", Response of the Association of Radiowave Technology, 1981. In the case of a satellite broadcast, $f_B$ is 27 MHz or it is set to 36 MHz in the case of a communication satellite. For instance, when the video subcarrier is 7.16 MHz, the frequency deviation of video subcarrier is 0.52 MHz. When the subvideo signal is 0.5 MHz, a degree of FM improvement is 7 dB from the equation (1) and the S/N ratio is improved by 7 dB. In this case, the occupied bandwidth of main carrier is about 26 MHz from the equation (3). Moreover, an amplitude value of video subcarrier is 0.44V from the frequency deviation of main carrier and the S/N ratio is deteriorated by about 7 dB. Therefore, deterioration when the subvideo signal is recovered and is cancelled by a degree of FM improvment. In the case the video subcarrier is 10.74 MHz, when the subvideo signal is 1.23 MHz and frequency deviation of video subcarrier is 1.5 MHz, if the multiplexing is carried out without overlap on the sound subcarrier, a degree of FM improvement becomes 8.6 dB. Therefore, the frequency deviation of main carrier can be made small as much and truncation interference on the main video signal can be suppressed.

Figure 20A:
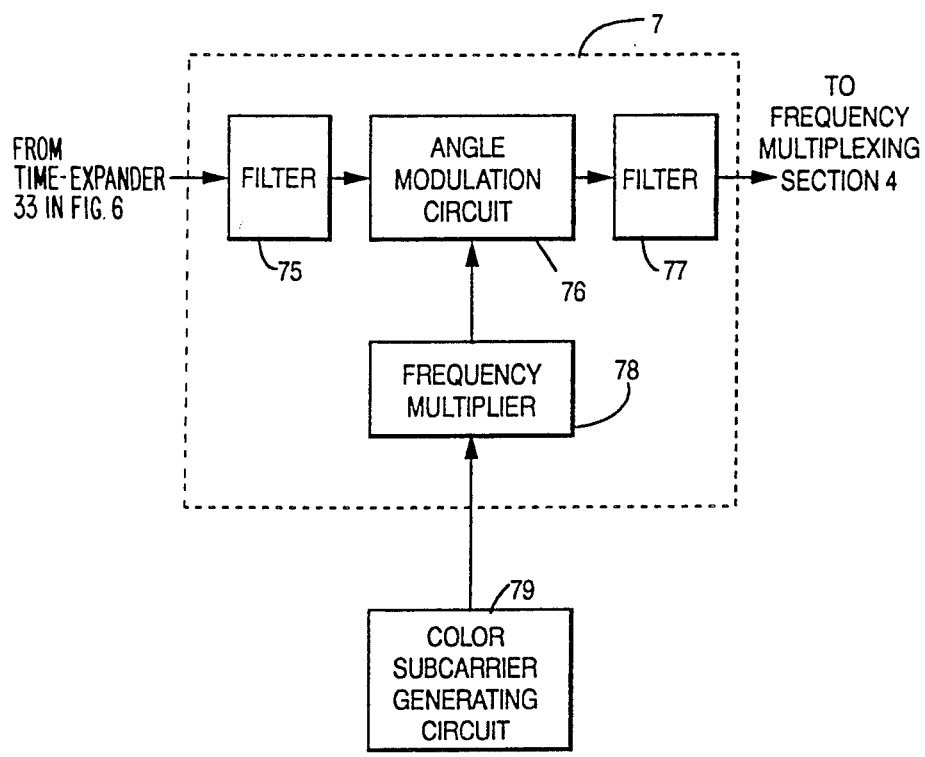

For the conversion of subvideo signal which realizes the enlargement of the aspect ratio explained in regard to FIG. 6 to the multiplex modulation signal, as shown in FIG. 8(d), since the subvideo signal extracted from the main and subvideo signal separating section 8 is frequency converted to the lower frequency of 1.1 MHz, it can be supplied directly, without frequency conversion with the sound subcarrier, to the angle modulation circuit 76 through the filter 75 as shown in FIG. 20A. In this case, since the frequency bandwidth of multiplex modulation becomes narrower than that of high resolution signal, a degree of FM improvement becomes somewhat improved. Moreover, in the video signal having the aspect ratio which is larger than the ordinary value, it is also probable that only the higher frequency element of the side panel is transmitted. In such a case, the higher frequency element in the side panel is extracted and is then transmitted as the subvideo signal as explained previously.

As explained earlier, according to the present invention, interference on the main video signal is eased by lowering the amplitude of subcarrier and suppressing frequency deviation of main carrier and deterioration of S/N is improved by angle modulation of subvideo signal. Moreover, as the video subcarrier, the signal multiplying the color subcarrier used for generation of video signal is used but the video subcarrier of the independent frequency may be generated in some cases depending on the setting of frequency bandwidth of subvideo signal and a degree of FM improvement.

Figure 22:
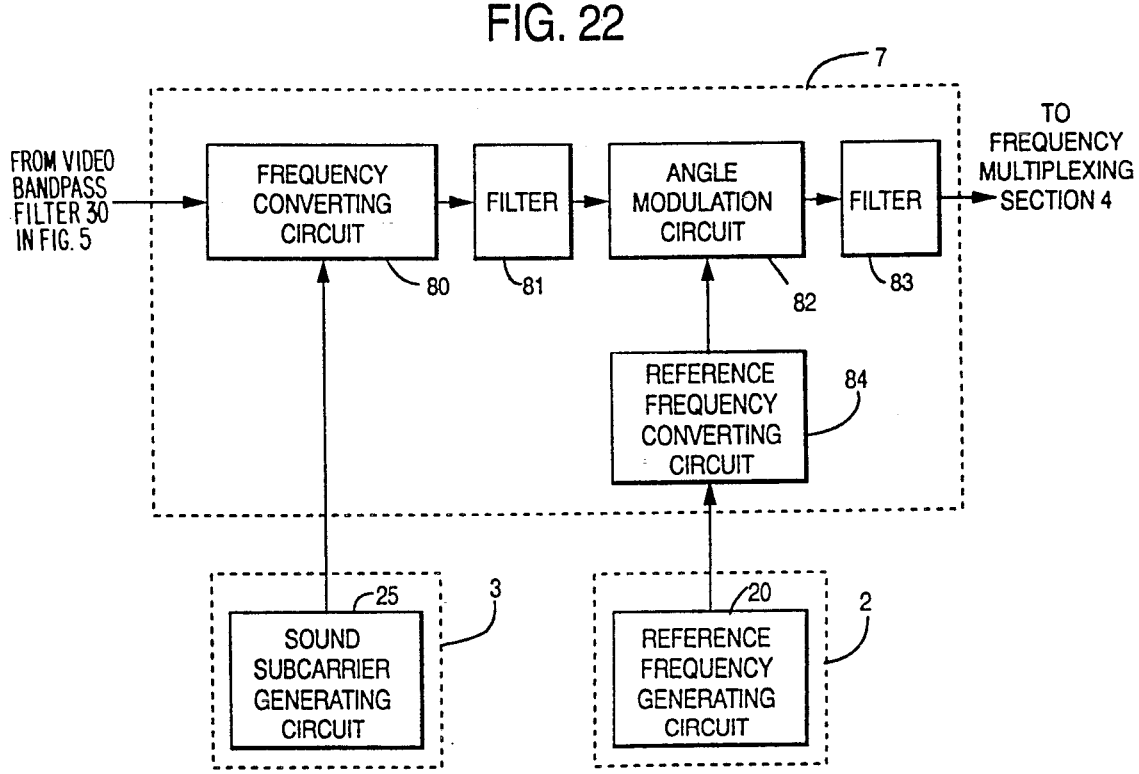
FIG. 22 and FIG. 22A are each a block diagram of the multiplex modulation signal generating section of the multiplex signal processing apparatus in accordance with a sixth embodiment of the present invention where, after frequency conversion of the subvideo signal with the sound subcarrier, the multiplex modulation signal is generated by angle modulation of the reference frequency signal of the sound modulation signal converting section.
Figure 21D:
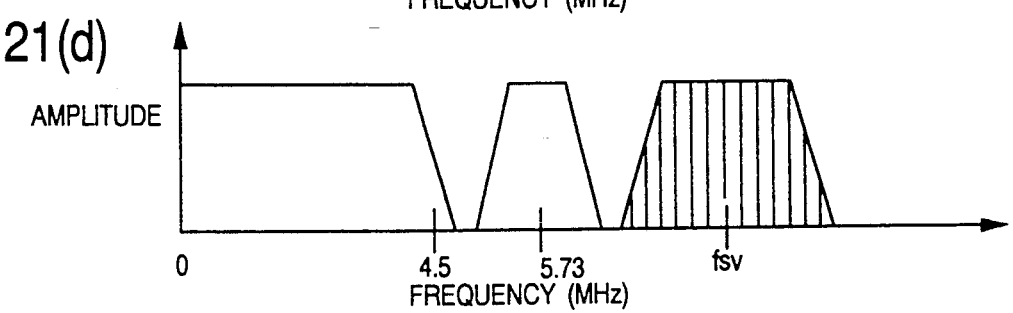

FIG. 22 is a block diagram of a sixth embodiment of the present invention. To convert the subvideo signal for higher resolution explained in regard to FIG. 5 to the multiplex modulation signal, the subvideo signal extracted from the main and subvideo signal separating section 8 is frequency-converted, as in the case of FIG. 15, by a frequency converting circuit 80 and the sound subcarrier generating circuit 25. Thereby the frequency band of FIG. 21(a) is converted to that of FIG. 21(b). Accordingly, the subvideo signal is converted from 0.23 MHz to 1.23 MHz. After elimination of unwanted signals with a filter 81, the frequency-converted signal is supplied as the modulation signal to an angle modulation circuit 82. Meanwhile, as the video subcarrier of the angle modulation circuit 82, the reference frequency of the reference frequency generating circuit 20 which generates the reference frequency of the sound modulation signal converting section 2 is divided and multiplied in a reference frequency converting circuit 84 to be supplied to the angle modulation circuit 82. In this case, when the reference signal is 12.288 MHz, it is converted to 8.19 MHz by ×(2/3) multiplication. In addition, according to the equation (1) as explained in regard to FIG. 20, the degree of FM improvement becomes 5.6 dB if the frequency deviation of video subcarrier is 1.12 MHz and the frequency band of subvideo signal is 1.23 MHz. Thereafter, only the multiplex modulation signal is selected from the angle modulation circuit 82 with a filter 83 and it is then supplied to the frequency multiplexing section 4. $f_{sv}$ of FIG. 21(b) is the video subcarrier supplied to the angle modulation circuit 82 and the multiplex modulation signal generated by angle modulation of the video subcarrier with the subvideo signal is shown in FIG. 21(c). The frequency band of this signal has the spectrum around the video subcarrier. The multiplex modulation signal is frequency multiplexed with the main video signal and sound subcarrier in the frequency multiplexing section 4 as shown in FIG. 21(d).

Figure 22A:
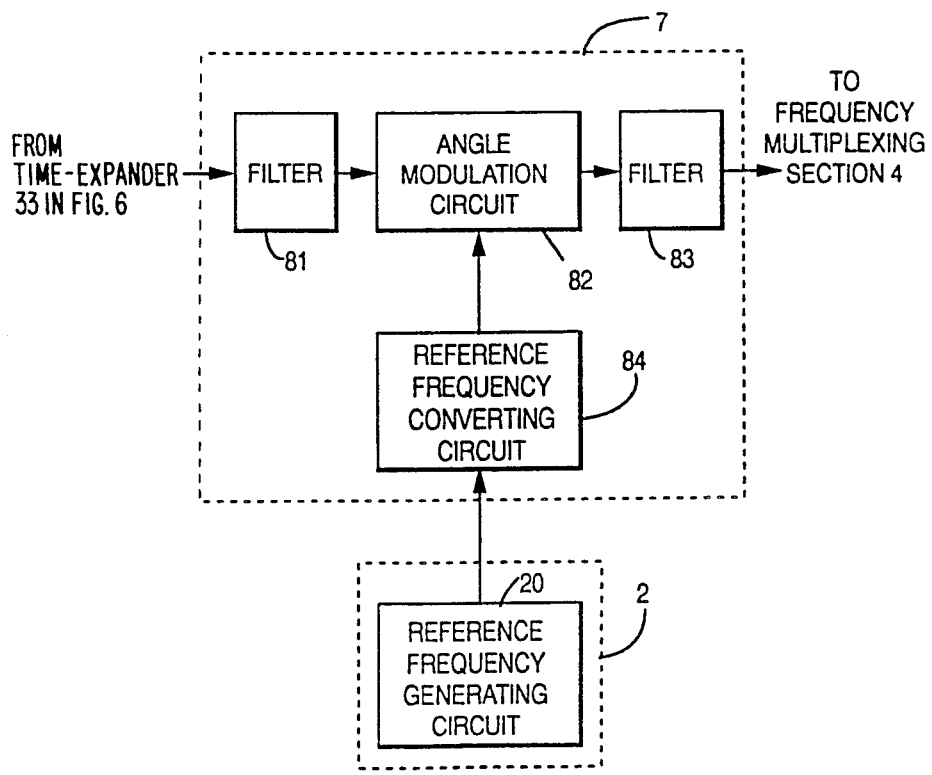

In the case of converting the subvideo signal, the signal for enlargement of aspect ratio explained in regard to FIG. 6, to the multiplex modulation signal, since the subvideo signal extracted from the main and subvideo signal separating section 8 is already frequency converted to a low frequency of 1.1 MHz as shown in FIG. 8(d), it can directly be supplied to the angle modulation circuit 82 through the filter 81 without frequency conversion with the sound subcarrier as shown in FIG. 22A. In this case the frequency bandwidth of multiplex modulation signal becomes narrower than that of the signal for higher resolution and therefore a degree of FM improvement can be somewhat enhanced. Moreover, in the video signal having an aspect ratio which is larger than the ordinary value, it is also probable that only the higher frequency element of the side panel is transmitted. In such a case, the higher frequency element in the side panel is extracted and is then transmitted as the subvideo signal as explained previously.

As explained earlier, according to the present invention, the interference to be applied on the main video signal can be eased by lowering amplitude of subcarrier and suppressing frequency shift of main carrier and deterioration of S/N can be improved by angle modulation of subvideo signal. Moreover, as the video subcarrier, the reference frequency to be used for PCM encoding of the sound signal is used after the frequency conversion, but the video subcarrier of independent frequency may be generated depending on the setting of frequency band of subvideo signal and degree of FM improvement.

Figure 23:
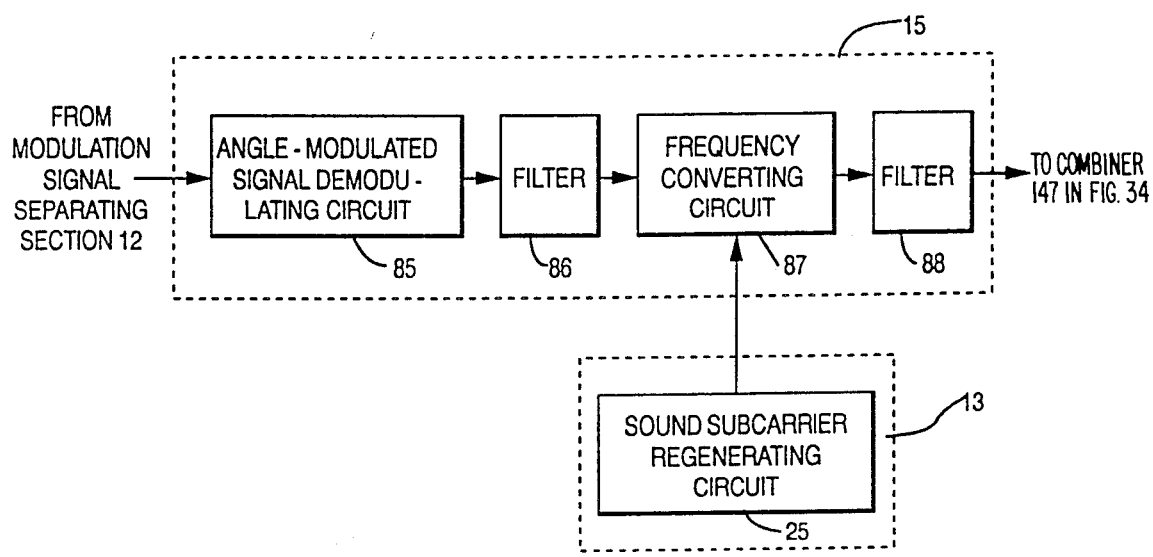
FIG. 23 and FIG. 23A are each a block diagram of the multiplex modulation signal demodulating section of the multiplex signal processing apparatus in accordance with the fifth and sixth embodiments of the present invention where, after demodulation of the multiplex modulation signal generated by angle modulation of the color subcarrier or of the reference frequency signal of the sound modulation signal converting section, the subvideo signal is recovered by frequency conversion with the sound subcarrier.
Figure 23A:
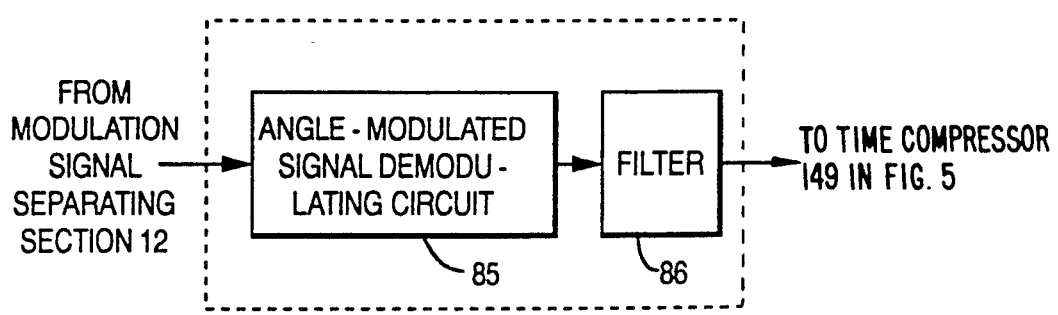

FIG. 23 is a structure for demodulating the multiplex modulation signal explained in regard to FIG. 20 and FIG. 22. The multiplex modulation signal extracted from the modulation signal separating section 12 which separates the main video signal, sound subcarrier and multiplex modulation signal is supplied to an angle modulation signal demodulating circuit 85. This circuit regenerates the multiplex signal included in the video subcarrier and eliminates unwanted signals with a filter 86 and then supplies the signal to a frequency converting circuit 87. The demodulation signal eliminates unwanted signals with a filter 88 and is then converted to the frequency band of 1.23 MHz from 0.23 MHz shown in FIG. 21(b). To the frequency converting circuit 87, the sound subcarrier regenerated by the sound subcarrier regenerating circuit 25 is supplied. Thereby, the multiplex signal is frequency-converted to the frequency band of 5.5 MHz from 4.5 MHz and becomes the subvideo signal of the frequency band shown in FIG. 21(a). The filter 88 is used for eliminating unwanted signals generated during the frequency conversion. When the multiplex modulation signal is the signal for higher resolution, it is directly supplied to the main and sub video signal combining section 16 to regenerate the video signal. However, when it is the signal for the enlargement of the aspect ratio, an output of the filter 86 is supplied to the main and sub video signal combining section 16 as shown in FIG. 23A.

As explained earlier, according to the present invention, the subvideo signal is angle-modulated to the video subcarrier and the video subcarrier obtained by angle modulation of subvideo signal is converted to the frequency higher than the sound subcarrier to generate the multiplex modulation signal. Thereby, the multiplex signal can be transmitted without giving influence on the sound subcarrier. Moreover, since the video subcarrier is angle-modulated, the deterioration of the S/N ratio of the subvideo signal can be improved even when the frequency deviation of main carrier by the multiplex modulation signal of main carrier is lowered.

Figure 24:
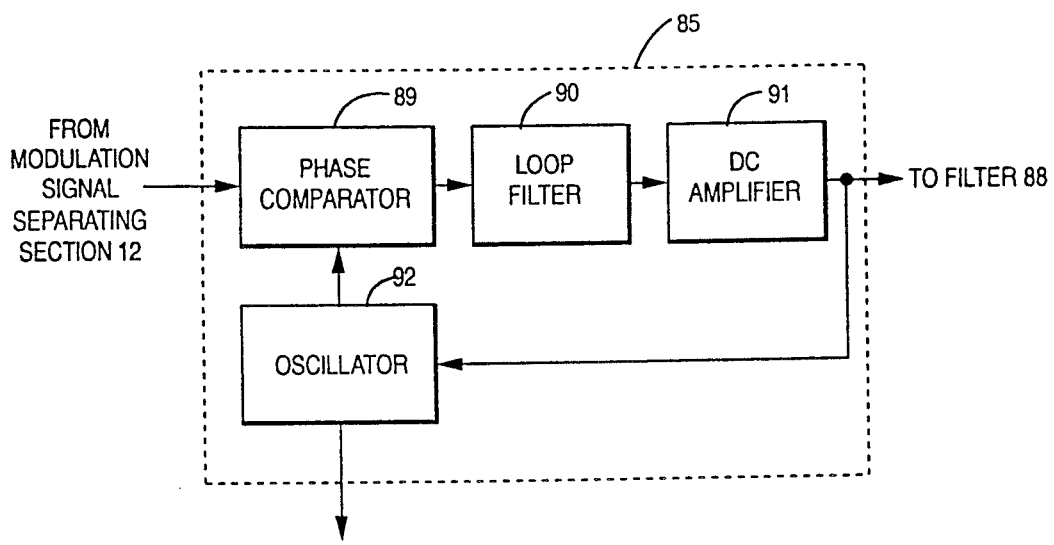
FIG. 24 is an embodiment of an angle modulation signal demodulating circuit of FIG. 23.

FIG. 24 is an embodiment of the angle modulation signal demodulating circuit 85 shown in FIG. 23. The multiplex modulation signal entering from the modulation signal separating part 12 is supplied to a phase comparator 89 and is compared with the oscillation signal of an oscillator 92 in the frequency and phase. The result of comparison is then supplied to a loop filter 90 and a DC amplifier 91 and is then returned to the oscillator 91 after elimination of the high frequency element. Accordingly, these elements are forming a phase locked loop circuit. Therefore, the oscillator 91 follows the momentary frequency of the multiplex modulation signal and an output of the DC amplifier 92 becomes the demodulation signal. Thereby an output of DC amplifier 92 is supplied to the filter 88. As explained above, this embodiment forms the angle modulation signal demodulating circuit with the phase locked loop circuit and it may easily be formed as a semiconductor integrated circuit. However, the similar performance can also be attained by using a pulse count circuit.

FIG. 25 shows a seventh embodiment. The subvideo signal entering from the main and subvideo signal separating section 8 becomes the multiplex signal which is converted to the band width of 1.23 MHz of FIG. 26(b) from 0.23 MHz of FIG. 26(a) in a frequency converting circuit 93 to which the sound subcarrier is supplied from the sound subcarrier generating circuit 25. Moreover, the multiplex signal is separated to a pair of frequency bands by filters 94 and 95. The signal of lower frequency band is supplied to an amplitude modulation circuit 96. The signal of higher frequency band is supplied to a frequency converting circuit 97. Thereby, the reference frequency from the reference frequency generating circuit 20 is divided and multipled in a reference frequency converting circuit 104 to be supplied to the frequency converting circuit 97 for frequency conversion of the multiplex signal. For instance, in the case the reference frequency is multiplied by (15/128) times, it becomes 1.44 MHz as indicated by the frequency allocation of FIG. 26(c), as a result of frequency conversion, the signal is converted to a low frequency as shown in FIG. 26(c). The frequency-converted signal is supplied to an amplitude modulation circuit 99 after elimination of unwanted signals with a filter 98. The signal obtained by multiplying the color subcarrier generated from the color subcarrier generating circuit 59 in a frequency multiplier 103 is supplied to the amplitude modulation circuits 96, 99 and this signal is then supplied to the amplitude modulation circuit 99 after phase shift in a $\pi/2$ phase shifter. The amplitude modulation circuits 96, 99 execute the orthogonal modulation. Thereafter, the outputs of amplitude modulation circuits 96, 99 are combined in a combining circuit 100 and are converted as shown in FIG. 26(c) from FIG. 26(d) after elimination of unwanted signal with the filter 101. The signal is then supplied to the frequency multiplexing section 4 and is converted to the modulation signal shown in FIG. 26(f). Moreover, the subvideo signal sent from the main and subvideo signal separating section 8, if it is the signal for the enlargement of the aspect ratio, is directly supplied to the filters 94, 95. In the video signal having an apsect ratio larger than the ordinary ratio, only the high frequency element of the side panel may sometimes be transmitted as the subvideo signal.

Figure 27:
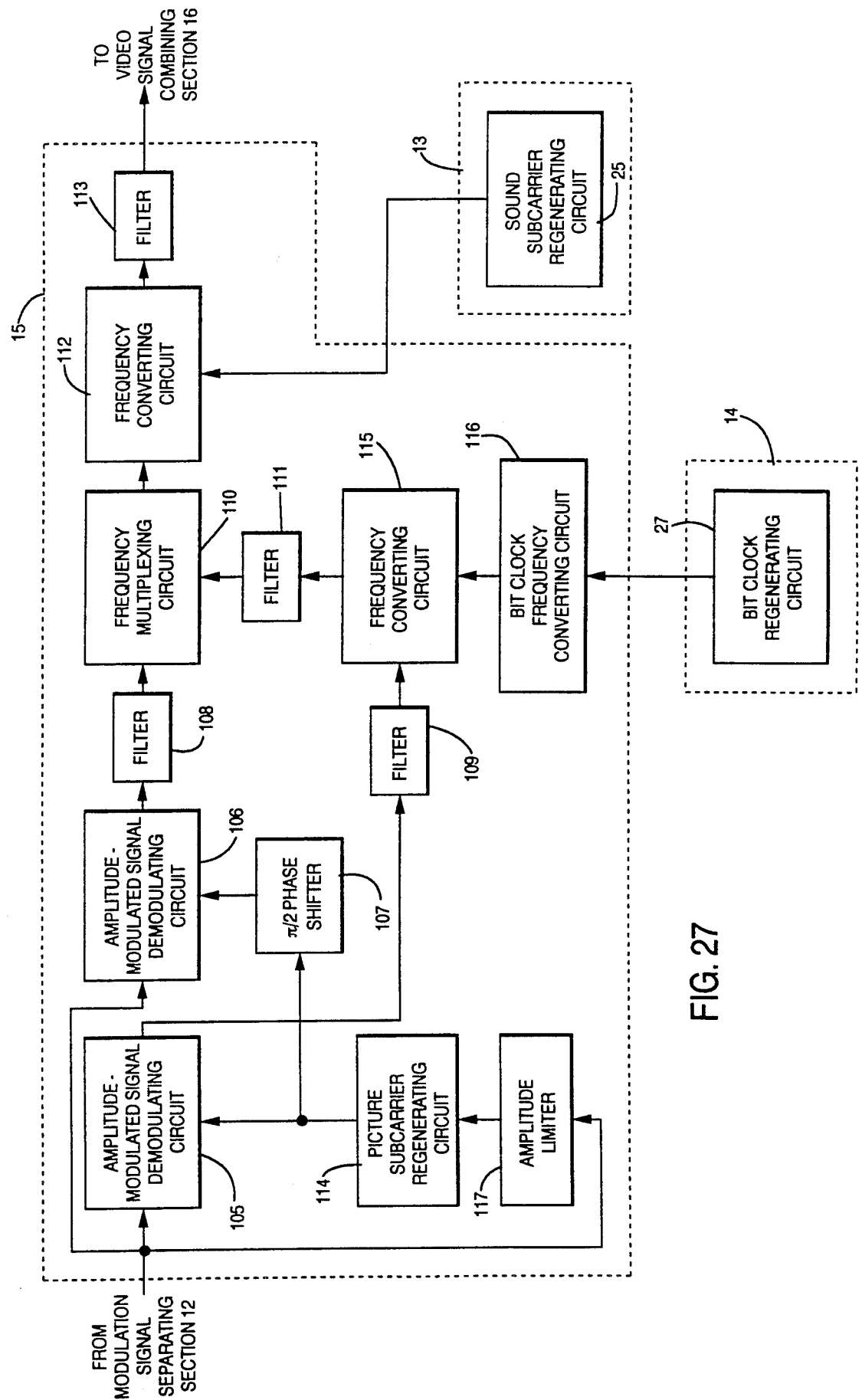
FIG. 27 is a block diagram of the multiplex modulation signal demodulating section of the multiplex signal processing apparatus in accordance with the seventh embodiment of the present invention where, after demodulation of the multiplex modulation signal generated by orthogonal amplitude modulation of the color subcarrier, the subvideo signal is regenerated by frequency conversion with the sound subcarrier.

FIG. 27 is a seventh embodiment indicating the structure for demodulating multiplex modulation signal. The multiplex modulation signal is separated by the modulation signal separating section 12 and is then supplied to an amplitude modulation signal demodulating circuit 105. Meanwhile, the multiplex modulation signal is applied to an amplitude limiter 117 and a video subcarrier regenerating circuit 114 and thereby the video subcarrier is recovered and is then supplied to the amplitude modulation signal demodulating circuit 105 for synchronous detection. The multiplex modulation signal is supplied to the amplitude modulation signal demodulating circuit 106 and it is orthogonally and synchronously detected with the signal obtained by phase shift of the output of video subcarrier regenerating circuit 114 with the $\pi/2$ phase shifter 107. After elimination of unwanted signals with a filter 109, an output of the amplitude modulation signal demodulating circuit 105 is supplied to a frequency conversion circuit 115. In the frequency conversion circuit 115, the signal of bit clock regenerating circuit 27 is divided and multiplied in a bit clock frequency conversion circuit 116 and is then supplied for frequency conversion of multiplex signal. As a result, such a signal has the spectrum of FIG. 26(c). The frequency-converted multiplex signal is supplied to a frequency multiplexing circuit 110 through a filter 111. On the other hand, the multiplex signal, the demodulation signal of the amplitude modulation signal demodulating circuit 106 is supplied to the frequency multiplexing circuit 110 through a filter 108. In the frequency multiplexing circuit 110, the multiplex signal as shown in FIG. 26(b) is recovered and is converted to the frequency of FIG. 26(a) through a frequency conversion circuit 112 and the demodulation signal can be obtained through a filter 113. In this case, frequency conversion is carried out using the sound subcarrier. Since the amplitude modulation demodulation circuit executes the synchronous detection, the signals in an orthogonal relationship can be eliminated and only the signal of the detection axis can be regenerated. However, an output of the frequency multiplexing circuit 110, if it is the signal for the enlargement of the aspect ratio, is supplied to the main and subvideo signal combining section 16.

As explained previously, according to the present embodiment, the subvideo signals separated into two portions orthogonally amplitude-modulate the video subcarrier and therefore these two signals are independent of each other. Moreover, in case the video subcarrier has the same frequency as the embodiment of FIG. 15, the doubled transmission band can be obtained and the frequency can thereby be used effectively. Moreover, if the same subvideo signal is transmitted, the frequency of video subcarrier can be lowered and the occupied bandwidth of main carrier becomes narrow.

Figure 28:
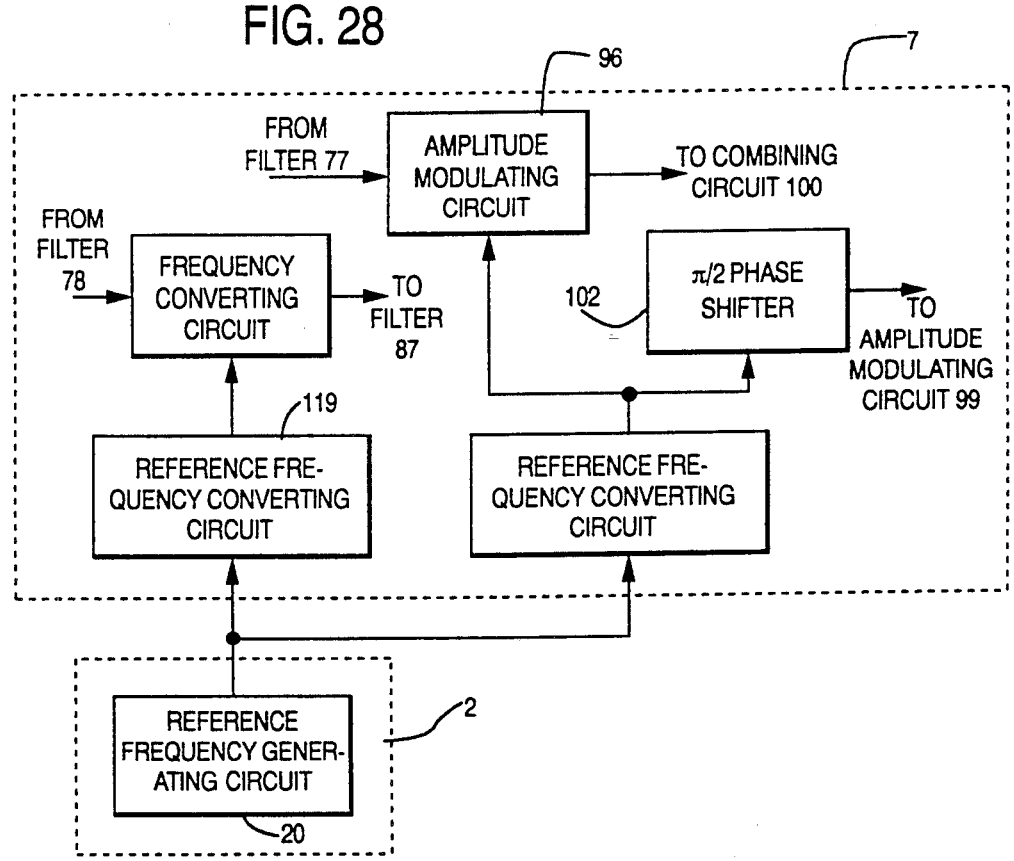
FIG. 28 is an eighth embodiment where the video subcarrier of FIG. 25 is generated from the reference frequency.
Figure 29:
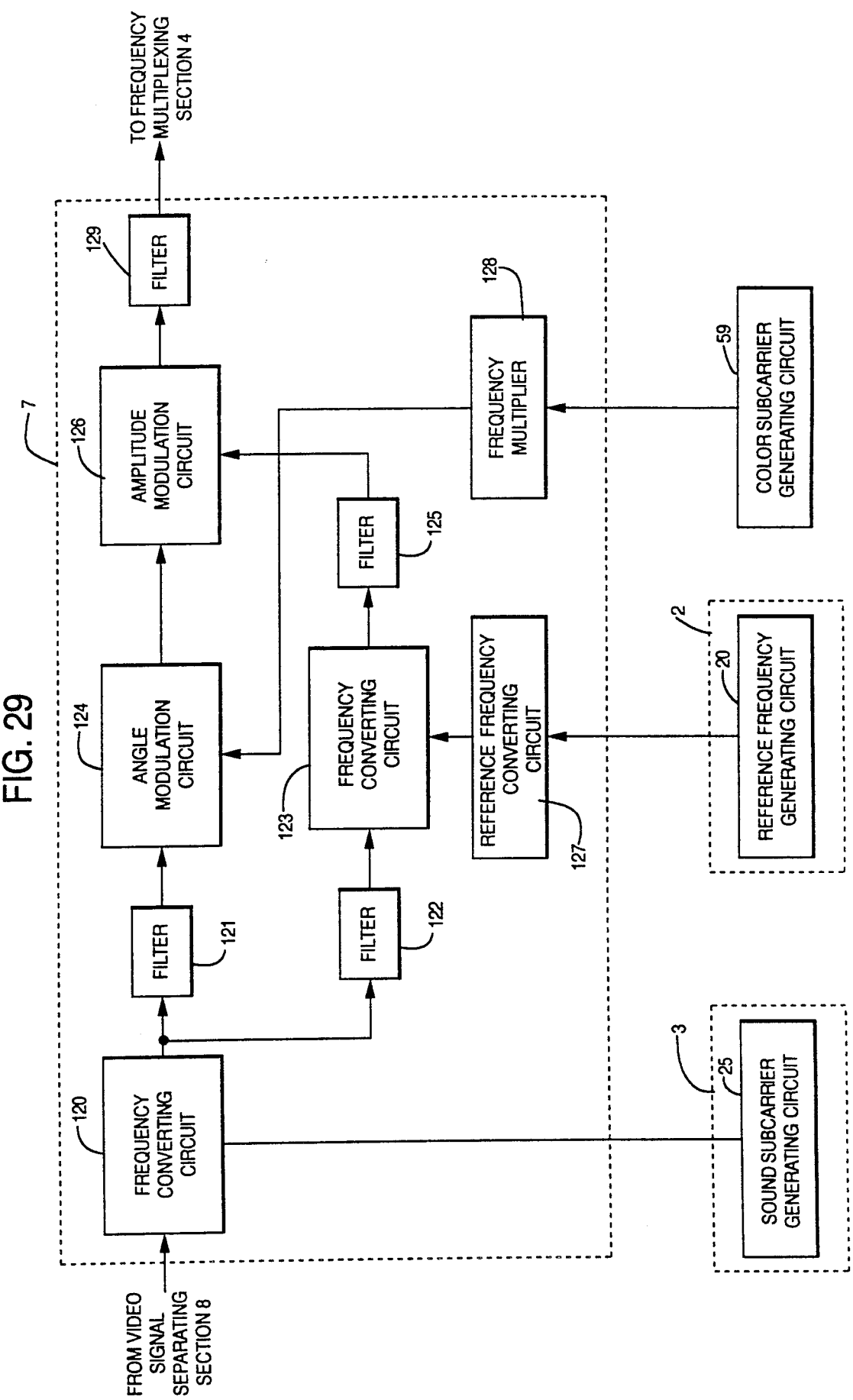
FIG. 29 is a block diagram of the multiplex modulation signal generating section of the multiplex signal processing apparatus in accordance with a ninth embodiment of the present invention where, during the frequency conversion of the subvideo signal with the sound subcarrier, the multiplex modulation signal is generated by angle modulation of the one frequency band signal multiplexed as the color subcarrier and thereafter by amplitude modulation of the other frequency band signal.
Figure 30A:
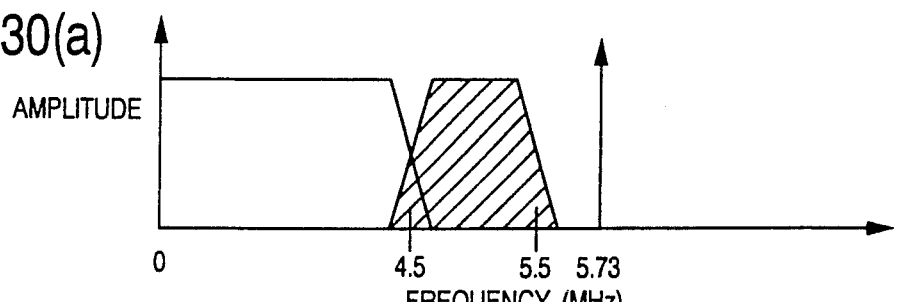
FIGS. 30a–30f are frequency spectrum in accordance with the ninth embodiment of the present invention where, during the frequency conversion of the subvideo signal with the sound subcarrier, the multiplex modulation signal is generated by angle modulation of the one frequency band signal multiplexed as the color subcarrier and thereafter by amplitude modulation of the other frequency band signal.
Figure 30B:
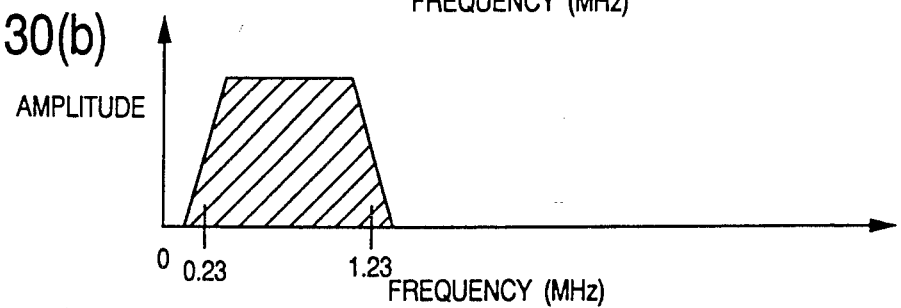
Figure 30C:
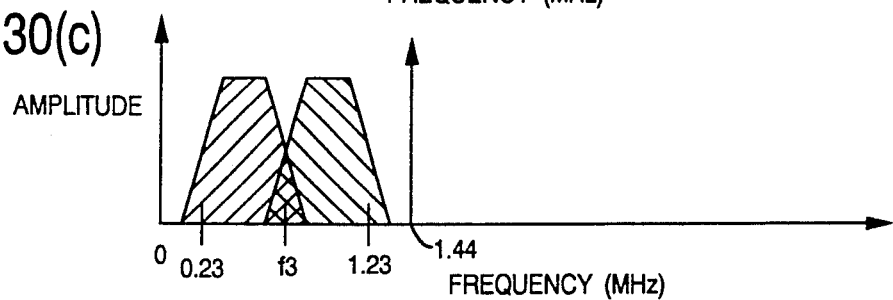
Figure 30D:
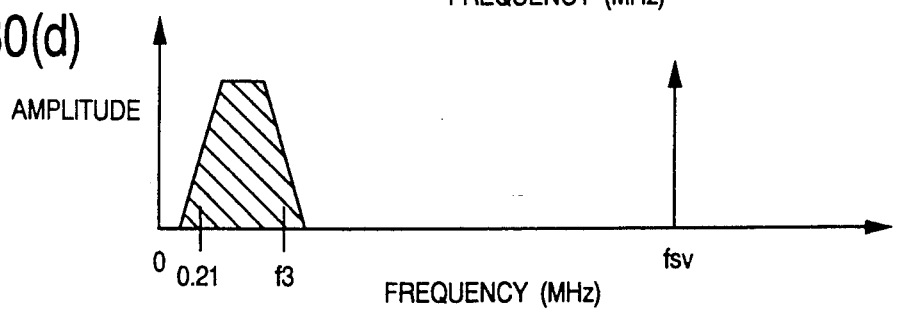
Figure 30E:
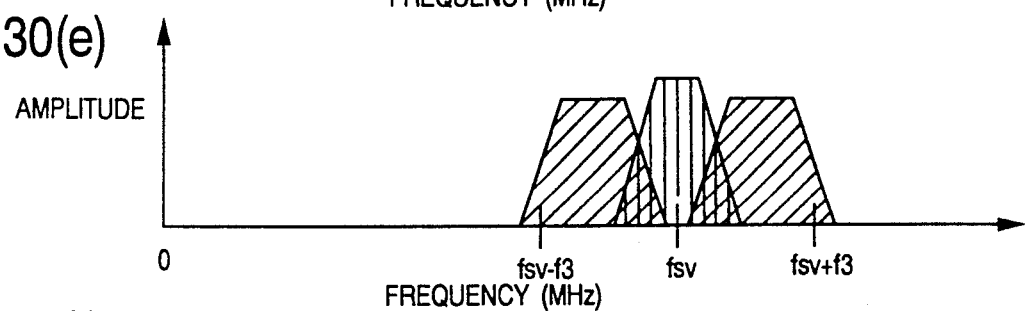
Figure 30F:
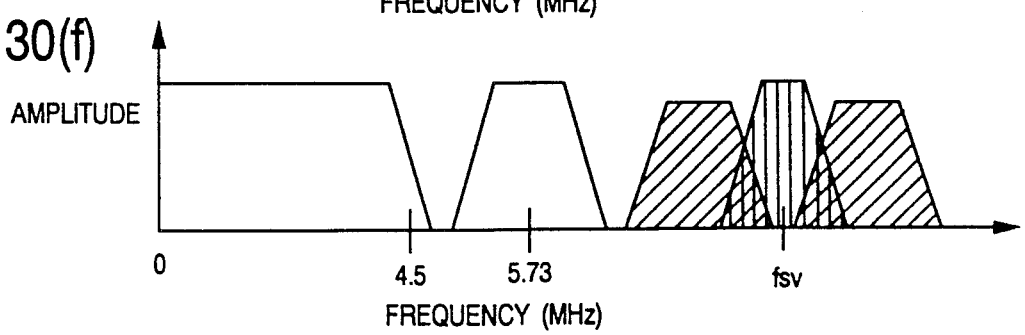

FIG. 28 is an eighth embodiment. In this figure, the reference frequency of the reference frequency generating circuit 20 explained in regard to FIG. 25 is frequency-converted to obtain the video subcarrier for the amplitude modulation circuits 99,96. A detailed explanation about the reference frequency converting circuit 119, frequency converting circuit 97, amplitude modulation circuits 96, 99 and $\pi/2$ phase shifter 102 has been omitted here because these circuits operate in the same way as those of FIG. 25. The reference frequency is converted to the video subcarrier in the reference frequency converting circuit 118 and is supplied to the amplitude modulation circuit 96 and $\pi/2$ phase shifter 102 and thereafter to the amplitude modulation circuit 99. For example, the video subcarrier signal is multiplied by (7/12) or (8/12) in the reference frequency converting circuit 118. In this embodiment, a part of the conventional circuit structure may be used and the circuit can be simplified by making use of the frequency conversion of a part of band of the subvideo signal and the reference frequency using the video subcarrier of the amplitude modulation circuit for the sampling of the sound signal FIG. 29 is a ninth embodiment. The subvideo signal entering from the main and subvideo signal separating section 8 is converted to the multiplex signal of 1.23 MHz of FIG. 30(b) from the signal of 0.23 MHz of FIG. 30(a) in a frequency converting circuit 120 to which the sound subcarrier is supplied from the sound subcarrier generating circuit 25. Moreover the multiplex signal is separated into a pair of frequency bands by filters 121, 122. In this case, the dividing frequency is defined as $f_3$. The lower band signal is supplied to an angle modulation circuit 124. Moreover, the higher frequency signal is supplied to a frequency converting circuit 123 and the reference frequency sent from the reference frequency generating circuit 20 is divided and multiplied in a reference frequency converting circuit 127 and is then supplied to the frequency converting circuit 123 for frequency conversion of multiplex signal. For instance when the reference frequency is multiplied by (15/128) times, it becomes 1.4 MHz having frequency allocation shown in FIG. 30(c). As a result of frequency conversion, the signal is converted to the lower frequency as shown in FIG. 30(d). The frequency-converted signal is then supplied to an amplitude modulation circuit 126 after elimination of unwanted signals with a filter 125. To the amplitude modulation circuit 126, the angle-modulated video subcarrier is supplied. It is then amplitude-modulated by the multiplex signal, the output of the filter 125 and is then supplied to the frequency multiplexing section 4 through a filter 129 for eliminating unwanted signals. Thereby, the frequency spectrum is allocated around $f_{sv}$ of FIG. 30(e) and it is frequency-multiplexed with the main video signal and sound subcarrier in the frequency multiplexing section 4 with the frequency allocation of FIG. 30(f).

The divided frequency of subvideo signal is divided so that the occupied frequency bandwidths of the angle modulation and amplitude modulation become the same. For example, when the video subcarrier $f_{sv}$ is 7.17 MHz, if the divided frequency f3 is set to 0.53 MHz, the bandwidth of amplitude modulation becomes 1.4 MHz. When the frequency deviation of angle modulation is set to 0.5 MHz, the bandwidth becomes 1.1 MHz. With the angle modulation, the bandwidth of amplitude modulation expands by 0.25 MHz in the upper and lower region and thereby the bandwidth does not overlap on the sound subcarrier. In this case, a degree of FM improvement becomes 6.6 dB. Above explanation is based on the equations (1), (2), (3) used for explanation in regard to FIG. 20. Moreover, the subvideo signal sent from the main and subvideo signal separating section 8, if it is the signal for the enlargement of the aspect ratio, may be directly supplied to the filters 94, 95. Moreover, in the video signal having the aspect ratio which is larger than the ordinary value, it is also probable that only the higher frequency element of the side panel is transmitted. In such a case, the higher frequency element in the side panel is extracted and is then transmitted as the subvideo signal as explained previously.

Figure 31:
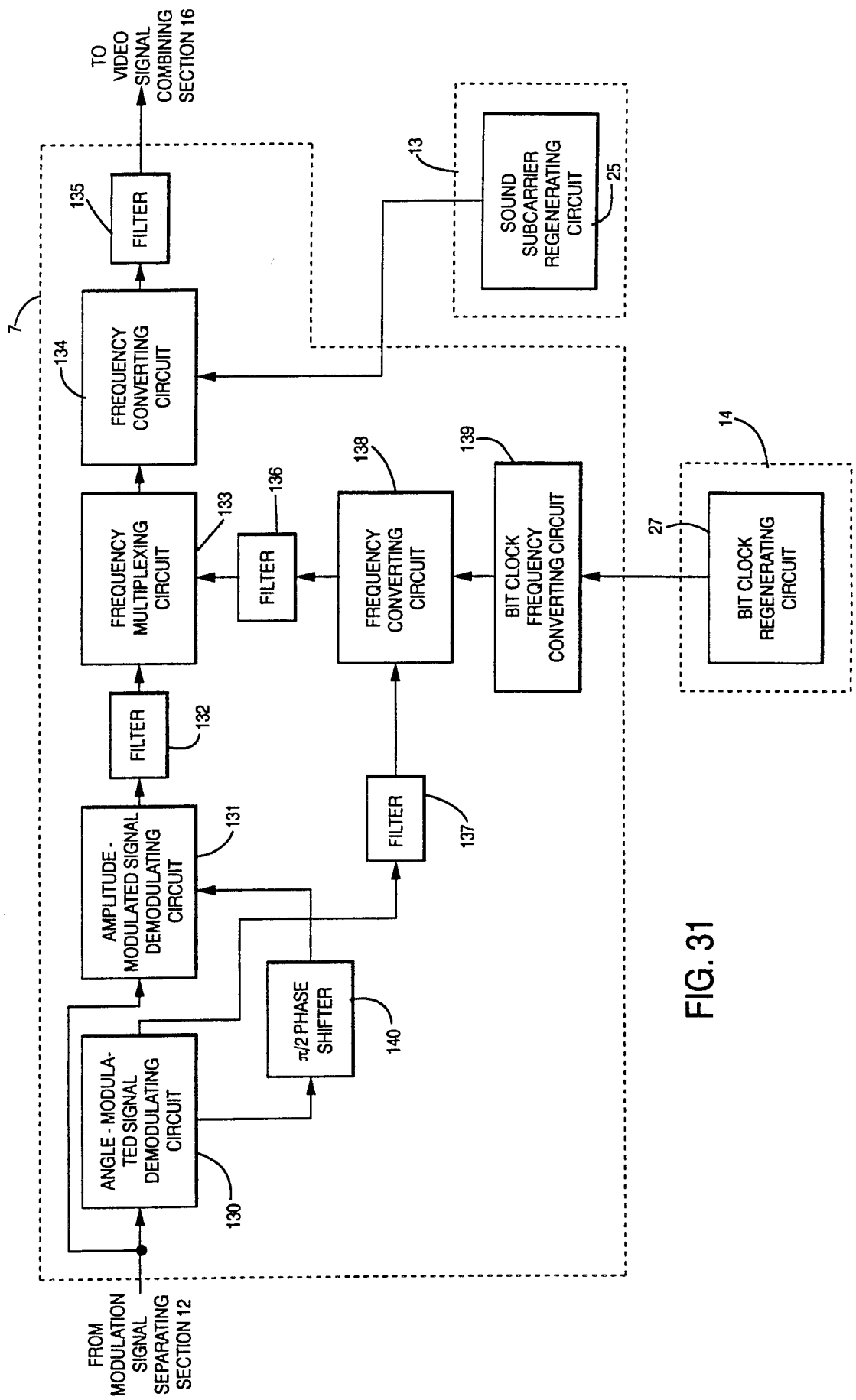
FIG. 31 is a block diagram of the multiplex modulation signal demodulating section of the multiplex signal processing apparatus in accordance with the ninth embodiment of the present invention where, demodulation of multiplex modulation signal generated by angle modulation and then amplitude modulation of the color subcarrier, the subvideo signal is regenerated by frequency conversion with sound subcarrier.

FIG. 31 is a ninth embodiment indicating a structure for demodulating the multiplex modulation signal. The multiplex modulation signal separated by the modulation signal separating section 12 and is then supplied to an angle modulation signal demodulating circuit 130. Here, the multiplex modulation signal demodulates the multiplex signal and is supplied to a frequency converting circuit 138 through a filter 137. The angle modulation signal demodulating circuit 130 is the phase locked loop circuit explained in regard to FIG. 24. The oscillation signal of the oscillator 92 is synchronized in frequency and phase with the video subcarrier. Therefore, it is in-phase with the video subcarrier through a π/2 phase shifter 140 and is then supplied to an amplitude modulation signal demodulating circuit 131.

In the amplitude modulation signal demodulating circuit 131, the multiplex modulation signal supplied is synchronously detected. After elimination of unwanted signals with a filter 132, the output of amplitude modulation signal demodulating circuit 131 is supplied to a frequency multiplex circuit 133. In the frequency converting circuit 138, the signal of bit clock regenerating circuit 27 is divided and multiplied by a bit clock frequency converting circuit 139 and is supplied for frequency conversion of the multiplex signal. As a result, the spectrum of FIG. 30(c) can be obtained. The frequency-converted multiplex signal is supplied to the frequency multiplexing circuit 133 through a filter 136. The multiplexed signal shown in FIG. 30(b) is regenerated in the frequency multiplexing signal 133 and it is converted to the frequency of FIG. 30(a) by a frequency converting circuit 134 and the demodulation signal can be obtained through a filter 135. In this case, the frequency conversion is carried out using the sound subcarrier. Moreover, the output of frequency multiplexing circuit 133, if it is the signal for the enlargement of the aspect ratio, is supplied to the main and subvideo signal combining section 16.

As explained previously, according to this embodiment, the subvideo signals separated into two signals are respectively amplitude-modulates and angle-modulates the video subcarrier. Therefore, the two signals are independent. In case the video subcarrier has the same frequency as the embodiment of FIG. 15, it means that the doubled transmission band can be obtained and the frequency can be used effectively. Moreover even if the same subvideo signal is to be transmitted, the frequency of the video subcarrier can be lowered and the occupied bandwidth of main carrier becomes narrower. Moreover, in case the angle modulation is carried out, FM improvement can be expected and the transmission can be made even with a low carrier level. In addition, it can be applied to QAM in the digital transmission.

Figure 32:
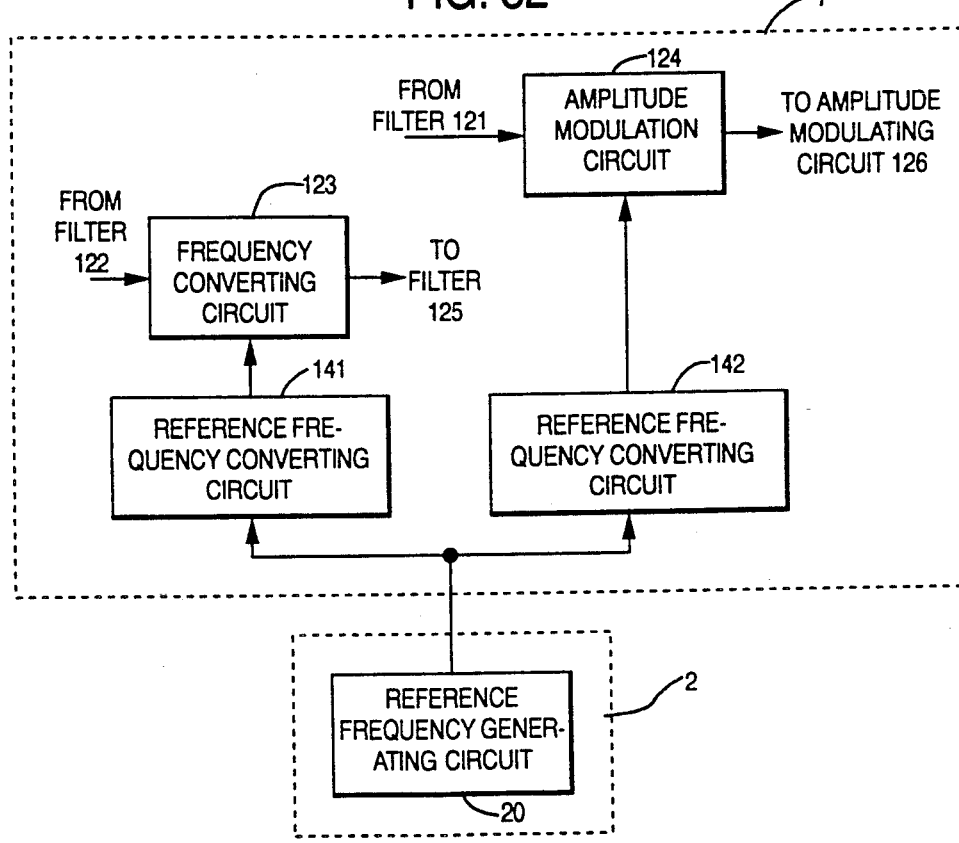
FIG. 32 is a block diagram of a tenth embodiment of the present invention where the video subcarrier of FIG. 29 is generated from the reference frequency.

FIG. 32 is a tenth embodiment. Here, the reference frequency of the reference frequency generating circuit 20 explained in regard to FIG. 29 is frequency-converted to obtain the video subcarrier of the angle modulation circuit 124. A reference frequency converting circuit 141, a frequency converting circuit 123 and an angle modulation circuit 124 are not explained in detail because these operate in the same way as those circuits of FIG. 29. The reference frequency is converted to the video subcarrier in the reference frequency converting circuit 142 and is supplied to the angle modulation circuit 124. For instance, the signal is multiplied by (7/12) times or (8/12) times in the reference frequency converting circuit 142. In this embodiment, a part of the conventional circuit structure can be used by utilizing the frequency conversion of a part of the bandwidth of the subvideo signal and the reference frequency using the video subcarrier of the angle modulation circuit for the same sound sampling and thereby circuit can be simplified.

Figure 33:
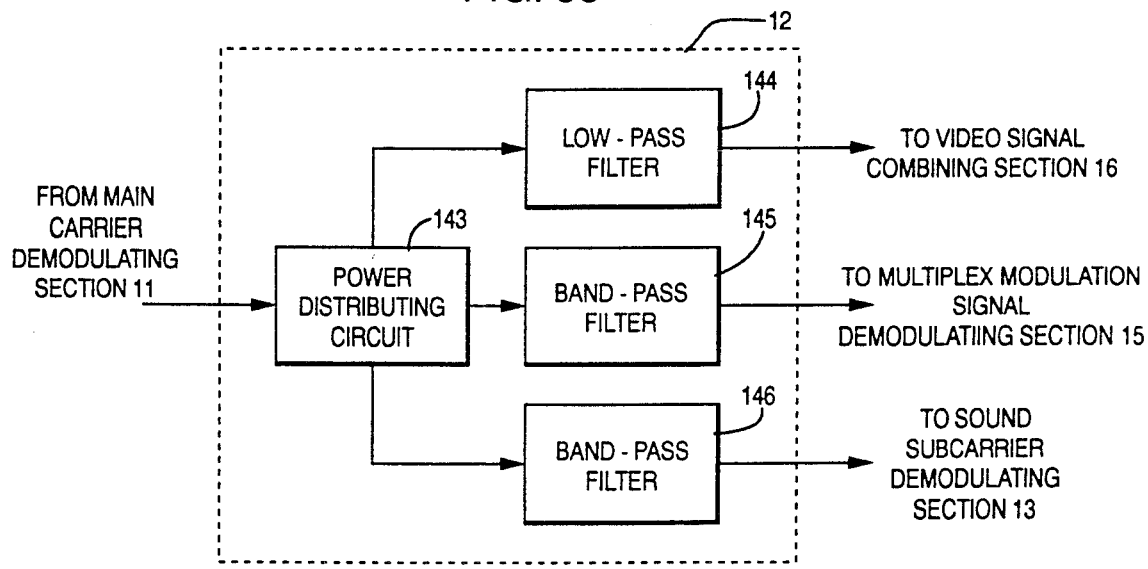
FIG. 33 is a block diagram of an embodiment of the modulation signal multiplexing section of the present invention.

FIG. 33 is an embodiment of the modulation signal separating section 12. The modulation signal output from the main and subcarrier demodulating section 11 is divided into three signals by a power distributing circuit 143. The first modulation signal is supplied to a low-pass filter 144 having a cut-off frequency of 4.5 MHz in order to obtain the main video signal. The second modulation signal is supplied to a band-pass filter 145 having the same bandwidth as the multiplex modulation signal in order to obtain the multiplex modulation signal. The third modulation signal is supplied to a band-pass filter 146 of bandwidth of 1.3 MHz at the center frequency of 5.73 MHz in order to obtain the sound subcarrier. Thereafter, the main video signal is supplied to the main and subvideo signal combining section 16, while the multiplex modulation signal to the multiplex modulation signal demodulating section 15 in order to obtain the subvideo signal and the sound subcarrier to the sound subcarrier demodulating section 13 in order to obtain the sound signal. Here, the power distribution circuit may be formed, for example, by a distribution circuit consisting of resistors.

Figure 34:
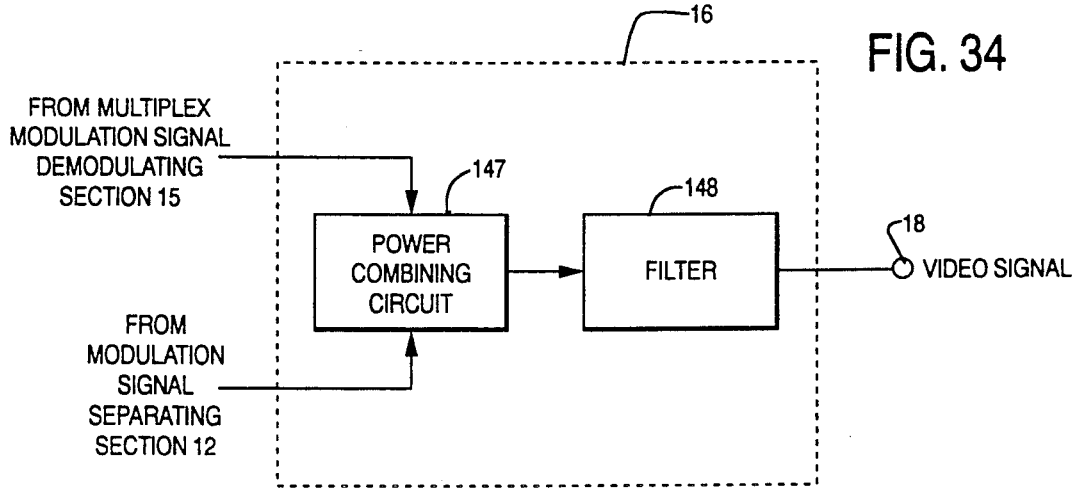
FIG. 34 is a block diagram of an embodiment of the main and sub video signal combining section where the multiplex modulating signal of the present invention is a high definition signal.

FIG. 34 is an embodiment of the main and subvideo signal combining section 16 where the multiplex signal is the high resolution signal. The subvideo signal supplied from the multiplex modulation signal demodulating section 15 is then supplied to a power combining circuit 147. Meanwhile, the main video signal is supplied to the power combining circuit 147 from the modulation signal separating section 12. Since the high resolution signal is formed by the frequency division, it may be combined in power. Thereafter, after elimination of unwanted signals with a filter 148, the signal is extracted from the terminal 18 as the video signal. Here, the power combining circuit may be the combining circuit formed by resistors and an adder formed by operational amplifiers.

Figure 35:
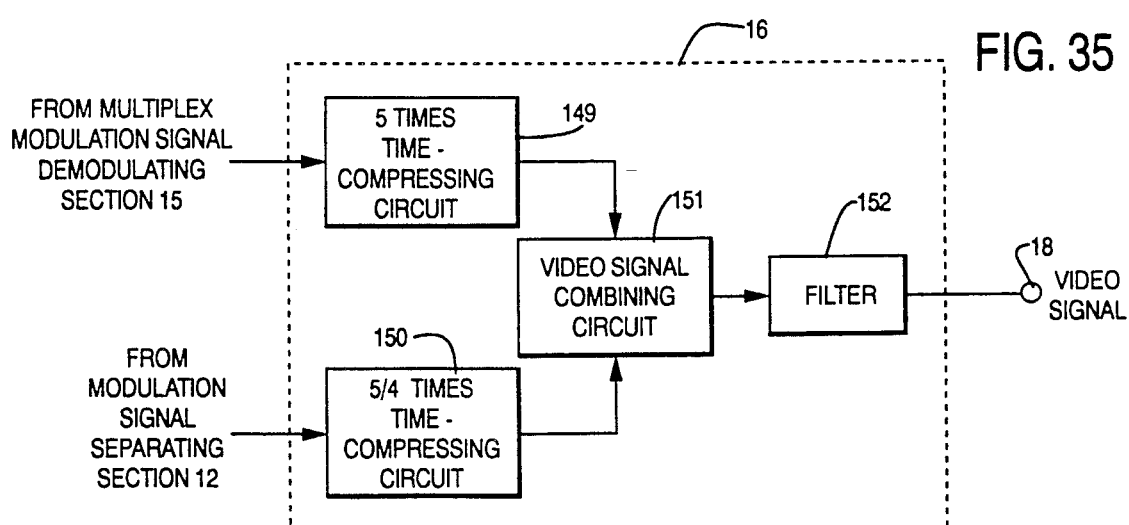
FIG. 35 is a block diagram of an embodiment of main and sub video signal combining section where the multiplex modulating signal of the present invention assures enlargement of the aspect ratio.

FIG. 35 is an embodiment of the main and subvideo signal combining section 16 where the multiplex signal is the signal for enlargement of aspect ratio. The subvideo signal supplied from the multiplex modulation signal demodulating section 15 is then supplied to the ×5 time-compression circuit 149. Meanwhile, the main video signal is supplied to the ×(5/4) time-compression circuit 150 from the modulation signal separating section 12. The signal for enlargement of aspect ratio is obtained by division on time axis and therefore these signals are inserted to both sides of image with the video time axis combining circuit 151. Thereafter, after elimination of of unwanted signals with the filter 152, the signal is converted to the video signal and is then output from the terminal 18. Here, the video time axis combining circuit may by the circuit for combining images by making use of the memory.

While the present invention has been described with respect to specific embodiments thereof, it is to be understood that the present invention is not limited thereto in any way but covers any and all changes and modifications which will become possible within the scope of claims.

What is claimed is:

1. A multiplex signal processing apparatus comprising:
   a sound modulation signal converting means for converting a sound signal to a sound modulation signal;
   a sound subcarrier modulating means for modulating a sound subcarrier with the sound modulation signal;
   a signal separating means for separating a video signal into a main video signal and a subvideo signal;
   a multiplex modulation signal generating means for angle modulating a video subcarrier having a frequency higher than that of the sound subcarrier with the subvideo signal to generate a multiplex modulation signal having a frequency higher than that of the sound carrier;
   a frequency multiplexing means for generating a modulation signal through frequency multiplexing of the main video signal, multiplex modulation signal and modulated sound subcarrier; and
   a main carrier modulating means for modulating a main carrier with the modulation signal.

2. A multiplex signal processing apparatus according to claim 1, wherein the video signal has a frequency band wider than that of an ordinary NTSC signal.

3. A multiplex signal processing apparatus according to claim 1, wherein the video signal has an aspect ratio larger than that of an ordinary NTSC signal.

4. A multiplex signal processing apparatus according to claim 1, wherein the subvideo signal assures a higher resolution.

5. A multiplex signal processing apparatus according to claim 1, wherein the subvideo signal assures an enlargement of an aspect ratio.

6. A multiplex signal processing apparatus according to claim 1, wherein the multiplex modulation signal generating means generates the multiplex modulation signal through frequency conversion of the subvideo signal with a predetermined signal.

7. A multiplex signal processing apparatus according to claim 6, wherein the multiplex modulation signal generating means comprises a means for obtaining the predetermined signal through frequency conversion of a reference frequency to be used for sound signal processing.

8. A multiplex signal processing apparatus according to claim 7, wherein the subvideo signal assures a high resolution.

9. A multiplex signal processing apparatus according to claim 1, wherein the multiplex modulation signal generating means further comprises a means for amplitude modulating the angle modulated video subcarrier with a further the subvideo signal.

10. A multiplex signal processing apparatus according to claim 9, wherein the multiplex modulation signal generating means comprises a means for separating the subvideo signal into a pair of signals.

11. A multiplex signal processing apparatus according to claim 10, wherein the multiplex modulation signal generating means comprises a means for amplitude modulating and angle modulating the video subcarrier respectively with the subvideo signals separated into a pair of signals.

12. A multiplex signal processing apparatus according to claim 1, wherein the multiplex modulation signal generating means comprises a means for generating the video subcarrier through frequency conversion of the color subcarrier.

13. A multiplex signal processing apparatus according to claim 1, wherein the multiplex modulation signal generating means comprises a means for generating the video subcarrier through frequency conversion of a reference frequency to be used for sound signal processing.

14. A multiplex signal processing apparatus according to claim 1, wherein the multiplex modulation signal generating means comprises a means for frequency converting the subvideo signal to a lower frequency band with a predetermined signal.

15. A multiplex signal processing apparatus according to claim 1, wherein the signal separating means defines the frequency band which is same as that of an ordinary NTSC signal of the video signals of a frequency band which is wider than that of the ordinary NTSC signal as the main video signal while the other frequency band as the subvideo signal.

16. A multiplex signal processing apparatus according to claim 1, wherein the signal separating means comprises a means for separating a signal having the same aspect ratio as that of an ordinary NTSC signal out of the video signal having an aspect ratio which is larger than that of the ordinary NTSC signal as the main video signal and the remaining signal as the subvideo signal and expands these signals on the time axis.

17. A multiplex signal processing apparatus comprising:
   a main carrier demodulating means for obtaining a modulation signal by demodulating an input signal;
   a modulation signal separating means for separating the modulation signal into a main video signal, a sound subcarrier and a multiplex modulation signal;
   a sound subcarrier demodulating means for regenerating a sound modulation signal from the sound subcarrier;
   a sound signal regenerating means for regenerating a sound signal from the sound modulation signal;
   a multiplex modulation signal demodulating means for demodulating the multiplex modulation signal consisting of an angle-modulated video subcarrier to regenerate a subvideo signal; and
   a signal combining means for combining the main video signal and the subvideo signal to regenerate a video signal.

18. A multiplex signal processing apparatus according to claim 17, wherein the video signal has a frequency band which is wider than that of an ordinary NTSC signal.

19. A multiplexer signal processing apparatus according to claim 17, wherein the video signal has an aspect ratio which is larger than that of an ordinary NTSC signal.

20. A multiplex signal processing apparatus according to claim 17, wherein the subvideo signal ensures a high resolution.

21. A multiplex signal processing apparatus according to claim 17, wherein the subvideo signal ensures a enlargement of an aspect ratio.

22. A multiplex signal processing apparatus according to claim 17, wherein the angle modulated video subcarrier has been further amplitude modulated by a further subvideo signal, and wherein the demodulating means further comprises means for demodulating the amplitude modulated angle modulated subcarrier to produce the further subvideo signal.

23. A multiplex signal processing apparatus according to claim 17, wherein the signal combining means comprises a means for regenerating the video signal of a frequency band which is wider than that of an ordinary NTSC signal by frequency-multiplexing the main video signal of the frequency band which is same as that of the ordinary NTSC signal and the subvideo signal of the other frequency band.

24. A multiplex signal processing apparatus according to claim 17, wherein the signal combining means comprises a means for regenerating the video signal having an aspect ratio which is larger than that of an ordinary NTSC signal by combining the main video signal having the aspect ratio which is the same as that of an ordinary NTSC signal and the subvideo signal of the remaining signal through compression of these signals on the time axis.

* * * * *